US012199550B2

(12) United States Patent
Nguyen et al.

(10) Patent No.: US 12,199,550 B2
(45) Date of Patent: Jan. 14, 2025

(54) LOW PROFILE CONNECTOR FOR SOLAR ROOFING SYSTEMS

(71) Applicant: GAF Energy LLC, Parsippany, NJ (US)

(72) Inventors: Thierry Nguyen, San Francisco, CA (US); Lewis Abra, San Francisco, CA (US); Hasib Amin, Parsippany, NJ (US); Babak Farhangi, Kew Gardens Hills, NY (US); Gabriela Bunea, San Jose, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 18/297,969

(22) Filed: Apr. 10, 2023

(65) Prior Publication Data

US 2023/0327601 A1 Oct. 12, 2023

Related U.S. Application Data

(60) Provisional application No. 63/329,163, filed on Apr. 8, 2022.

(51) Int. Cl.
*H02S 20/23* (2014.01)
*H02S 40/34* (2014.01)
*H02S 40/36* (2014.01)

(52) U.S. Cl.
CPC ............. *H02S 20/23* (2014.12); *H02S 40/34* (2014.12); *H02S 40/36* (2014.12)

(58) Field of Classification Search
None
See application file for complete search history.

(56) References Cited

U.S. PATENT DOCUMENTS 1,981,467 A 11/1934 Radtke
3,156,497 A 11/1964 Lessard
(Continued)

FOREIGN PATENT DOCUMENTS

CA 2829440 A 5/2019
CH 700095 A2 6/2010
(Continued)

OTHER PUBLICATIONS

English language machine translation of FR-2947099-A1. (Year: 2023).*
(Continued)

*Primary Examiner* — Eli S Mekhlin
(74) *Attorney, Agent, or Firm* — GREENBERG TRAURIG, LLP

(57) ABSTRACT

A system, including: a plurality of photovoltaic modules installed above a roof deck, where the plurality of photovoltaic modules includes at least a first photovoltaic module and a second photovoltaic module, where each of the plurality of photovoltaic modules includes: a top surface; a bottom surface opposite the top surface; a plurality of solar cells; a first receptacle on the top surface, where the first receptacle has: a plurality of first non-conductive openings, and a plurality of first conductive members in the plurality of first non-conductive openings; and a second receptacle on the bottom surface, where the second receptacle has: a plurality of second non-conductive openings, and a plurality of second conductive members in the plurality of second non-conductive openings, where at least a portion of the second photovoltaic module overlaps at least a portion of the first photovoltaic module, where the first receptacle of the first photovoltaic module is in mechanical connection with the second receptacle of the second photovoltaic module,
(Continued)

and where the first conductive members are in electrical communication with the second conductive members.

15 Claims, 10 Drawing Sheets

(56) References Cited

U.S. PATENT DOCUMENTS

| | | | |
|---|---|---|---|
| 3,581,779 | A | 6/1971 | Gilbert, Jr. |
| 4,258,948 | A | 3/1981 | Hoffmann |
| 4,349,220 | A | 9/1982 | Carroll et al. |
| 4,499,702 | A | 2/1985 | Turner |
| 4,636,577 | A | 1/1987 | Peterpaul |
| 5,167,579 | A | 12/1992 | Rotter |
| 5,437,735 | A | 8/1995 | Younan et al. |
| 5,590,495 | A | 1/1997 | Bressler et al. |
| 5,642,596 | A | 7/1997 | Waddington |
| 6,008,450 | A | 12/1999 | Ohtsuka et al. |
| 6,033,270 | A | 3/2000 | Stuart |
| 6,046,399 | A | 4/2000 | Kapner |
| 6,201,180 | B1 | 3/2001 | Meyer et al. |
| 6,207,889 | B1 * | 3/2001 | Toyomura ............... H02S 20/23 52/173.3 |
| 6,220,329 | B1 | 4/2001 | King et al. |
| 6,308,482 | B1 | 10/2001 | Strait |
| 6,320,114 | B1 | 11/2001 | Kuechler |
| 6,320,115 | B1 | 11/2001 | Kataoka et al. |
| 6,336,304 | B1 | 1/2002 | Mimura et al. |
| 6,341,454 | B1 | 1/2002 | Koleoglou |
| 6,407,329 | B1 | 6/2002 | Iino et al. |
| 6,576,830 | B2 | 6/2003 | Nagao et al. |
| 6,928,781 | B2 | 8/2005 | Desbois et al. |
| 6,972,367 | B2 | 12/2005 | Federspiel et al. |
| 7,138,578 | B2 | 11/2006 | Komamine |
| 7,155,870 | B2 | 1/2007 | Almy |
| 7,178,295 | B2 | 2/2007 | Dinwoodie |
| 7,487,771 | B1 | 2/2009 | Eiffert et al. |
| 7,587,864 | B2 | 9/2009 | McCaskill et al. |
| 7,678,990 | B2 | 3/2010 | McCaskill et al. |
| 7,678,991 | B2 | 3/2010 | McCaskill et al. |
| 7,748,191 | B2 | 7/2010 | Podirsky |
| 7,819,114 | B2 | 10/2010 | Augenbraun et al. |
| 7,824,191 | B1 | 11/2010 | Podirsky |
| 7,832,176 | B2 | 11/2010 | McCaskill et al. |
| 8,118,109 | B1 | 2/2012 | Hacker |
| 8,168,880 | B2 | 5/2012 | Jacobs et al. |
| 8,173,889 | B2 | 5/2012 | Kalkanoglu et al. |
| 8,210,570 | B1 | 7/2012 | Railkar et al. |
| 8,276,329 | B2 | 10/2012 | Lenox |
| 8,312,693 | B2 | 11/2012 | Cappelli |
| 8,319,093 | B2 | 11/2012 | Kalkanoglu et al. |
| 8,333,040 | B2 | 12/2012 | Shiao et al. |
| 8,371,076 | B2 | 2/2013 | Jones et al. |
| 8,375,653 | B2 | 2/2013 | Shiao et al. |
| 8,404,967 | B2 | 3/2013 | Kalkanoglu et al. |
| 8,410,349 | B2 | 4/2013 | Kalkanoglu et al. |
| 8,418,415 | B2 | 4/2013 | Shiao et al. |
| 8,438,796 | B2 | 5/2013 | Shiao et al. |
| 8,468,754 | B2 | 6/2013 | Railkar et al. |
| 8,468,757 | B2 | 6/2013 | Krause et al. |
| 8,505,249 | B2 | 8/2013 | Geary |
| 8,512,866 | B2 | 8/2013 | Taylor |
| 8,513,517 | B2 | 8/2013 | Kalkanoglu et al. |
| 8,586,856 | B2 | 11/2013 | Kalkanoglu et al. |
| 8,601,754 | B2 | 12/2013 | Jenkins et al. |
| 8,629,578 | B2 | 1/2014 | Kurs et al. |
| 8,646,228 | B2 | 2/2014 | Jenkins |
| 8,656,657 | B2 | 2/2014 | Livsey et al. |
| 8,671,630 | B2 | 3/2014 | Lena et al. |
| 8,677,702 | B2 | 3/2014 | Jenkins |
| 8,695,289 | B2 | 4/2014 | Koch et al. |
| 8,713,858 | B1 | 5/2014 | Xie |
| 8,713,860 | B2 | 5/2014 | Railkar et al. |
| 8,733,038 | B2 | 5/2014 | Kalkanoglu et al. |
| 8,776,455 | B2 | 7/2014 | Azoulay |
| 8,789,321 | B2 | 7/2014 | Ishida |
| 8,793,940 | B2 | 8/2014 | Kalkanoglu et al. |
| 8,793,941 | B2 | 8/2014 | Bosler et al. |
| 8,826,607 | B2 | 9/2014 | Shiao et al. |
| 8,835,751 | B2 | 9/2014 | Kalkanoglu et al. |
| 8,863,451 | B2 | 10/2014 | Jenkins et al. |
| 8,898,970 | B2 | 12/2014 | Jenkins et al. |
| 8,925,262 | B2 | 1/2015 | Railkar et al. |
| 8,943,766 | B2 | 2/2015 | Gombarick et al. |
| 8,946,544 | B2 | 2/2015 | Jabos et al. |
| 8,950,128 | B2 | 2/2015 | Kalkanoglu et al. |
| 8,959,848 | B2 | 2/2015 | Jenkins et al. |
| 8,966,838 | B2 | 3/2015 | Jenkins |
| 8,966,850 | B2 | 3/2015 | Jenkins et al. |
| 8,994,224 | B2 | 3/2015 | Mehta et al. |
| 9,032,672 | B2 | 5/2015 | Livsey et al. |
| 9,153,950 | B2 | 10/2015 | Yamanaka et al. |
| 9,166,087 | B2 | 10/2015 | Chihlas et al. |
| 9,169,646 | B2 | 10/2015 | Rodrigues et al. |
| 9,170,034 | B2 | 10/2015 | Bosler et al. |
| 9,178,465 | B2 | 11/2015 | Shiao et al. |
| 9,202,955 | B2 | 12/2015 | Livsey et al. |
| 9,212,832 | B2 | 12/2015 | Jenkins |
| 9,217,584 | B2 | 12/2015 | Kalkanoglu et al. |
| 9,270,221 | B2 | 2/2016 | Zhao |
| 9,273,885 | B2 | 3/2016 | Rordigues et al. |
| 9,276,141 | B2 | 3/2016 | Kalkanoglu et al. |
| 9,331,224 | B2 | 5/2016 | Koch et al. |
| 9,356,174 | B2 | 5/2016 | Duarte et al. |
| 9,359,014 | B1 | 6/2016 | Yang et al. |
| 9,412,890 | B1 | 8/2016 | Meyers |
| 9,528,270 | B2 | 12/2016 | Jenkins et al. |
| 9,605,432 | B1 | 3/2017 | Robbins |
| 9,711,672 | B2 | 7/2017 | Wang |
| 9,755,573 | B2 | 9/2017 | Livsey et al. |
| 9,786,802 | B2 | 10/2017 | Shiao et al. |
| 9,831,818 | B2 | 11/2017 | West |
| 9,912,284 | B2 | 3/2018 | Svec |
| 9,923,515 | B2 | 3/2018 | Rodrigues et al. |
| 9,938,729 | B2 | 4/2018 | Coon |
| 9,991,412 | B2 | 6/2018 | Gonzalez et al. |
| 9,998,067 | B2 | 6/2018 | Kalkanoglu et al. |
| 10,027,273 | B2 | 7/2018 | West et al. |
| 10,115,850 | B2 | 10/2018 | Rodrigues et al. |
| 10,128,660 | B1 | 11/2018 | Apte et al. |
| 10,156,075 | B1 | 12/2018 | McDonough |
| 10,187,005 | B2 | 1/2019 | Rodrigues et al. |
| 10,256,765 | B2 | 4/2019 | Rodrigues et al. |
| 10,284,136 | B1 | 5/2019 | Mayfield et al. |
| 10,454,408 | B2 | 10/2019 | Livsey et al. |
| 10,530,292 | B1 | 1/2020 | Cropper et al. |
| 10,560,048 | B2 | 2/2020 | Fisher et al. |
| 10,563,406 | B2 | 2/2020 | Kalkanoglu et al. |
| D879,031 | S | 3/2020 | Lance et al. |
| 10,579,028 | B1 | 3/2020 | Jacob |
| 10,784,813 | B2 | 9/2020 | Kalkanoglu et al. |
| D904,289 | S | 12/2020 | Lance et al. |
| 11,012,026 | B2 | 5/2021 | Kalkanoglu et al. |
| 11,177,639 | B1 | 11/2021 | Nguyen et al. |
| 11,217,715 | B2 | 1/2022 | Sharenko et al. |
| 11,251,744 | B1 | 2/2022 | Bunea et al. |
| 11,258,399 | B2 | 2/2022 | Kalkanoglu et al. |
| 11,283,394 | B2 | 3/2022 | Perkins et al. |
| 11,309,828 | B2 | 4/2022 | Sirski et al. |
| 11,394,344 | B2 | 7/2022 | Perkins et al. |
| 11,424,379 | B2 | 8/2022 | Sharenko et al. |
| 11,431,280 | B2 | 8/2022 | Liu et al. |
| 11,431,281 | B2 | 8/2022 | Perkins et al. |
| 11,444,569 | B2 | 9/2022 | Clemente et al. |
| 11,454,027 | B2 | 9/2022 | Kuiper et al. |
| 11,459,757 | B2 | 10/2022 | Nguyen et al. |
| 11,486,144 | B2 | 11/2022 | Bunea et al. |
| 11,489,482 | B2 | 11/2022 | Peterson et al. |
| 11,496,088 | B2 | 11/2022 | Sirski et al. |
| 11,508,861 | B1 | 11/2022 | Perkins et al. |
| 11,512,480 | B1 | 11/2022 | Achor et al. |
| 11,527,665 | B2 | 12/2022 | Boitnott |
| 11,545,927 | B2 | 1/2023 | Abra et al. |
| 11,545,928 | B2 | 1/2023 | Perkins et al. |

(56) References Cited

U.S. PATENT DOCUMENTS

| | | |
|---|---|---|
| 11,658,470 B2 | 5/2023 | Nguyen et al. |
| 11,661,745 B2 | 5/2023 | Bunea et al. |
| 11,689,149 B2 | 6/2023 | Clemente et al. |
| 11,705,531 B2 | 7/2023 | Sharenko et al. |
| 11,728,759 B2 | 8/2023 | Nguyen et al. |
| 11,732,490 B2 | 8/2023 | Achor et al. |
| 11,811,361 B1 | 11/2023 | Farhangi et al. |
| 11,824,486 B2 | 11/2023 | Nguyen et al. |
| 11,824,487 B2 | 11/2023 | Nguyen et al. |
| 11,843,067 B2 | 12/2023 | Nguyen et al. |
| 2002/0053360 A1 | 5/2002 | Kinoshita et al. |
| 2002/0129849 A1 | 9/2002 | Heckeroth |
| 2003/0101662 A1 | 6/2003 | Ullman |
| 2003/0132265 A1 | 7/2003 | Villela et al. |
| 2003/0217768 A1 | 11/2003 | Guha |
| 2004/0000334 A1 | 1/2004 | Ressler |
| 2005/0030187 A1 | 2/2005 | Peress et al. |
| 2005/0115603 A1 | 6/2005 | Yoshida et al. |
| 2005/0144870 A1 | 7/2005 | Dinwoodie |
| 2005/0178428 A1 | 8/2005 | Laaly et al. |
| 2005/0193673 A1 | 9/2005 | Rodrigues et al. |
| 2006/0042683 A1 | 3/2006 | Gangemi |
| 2006/0046084 A1 | 3/2006 | Yang et al. |
| 2007/0074757 A1 | 4/2007 | Mellott et al. |
| 2007/0181174 A1 | 8/2007 | Ressler |
| 2007/0193618 A1 | 8/2007 | Bressler et al. |
| 2007/0249194 A1 | 10/2007 | Liao |
| 2007/0295385 A1 | 12/2007 | Sheats et al. |
| 2008/0006323 A1 | 1/2008 | Kalkanoglu et al. |
| 2008/0035140 A1 | 2/2008 | Placer et al. |
| 2008/0078440 A1 | 4/2008 | Lim et al. |
| 2008/0185748 A1 | 8/2008 | Kalkanoglu |
| 2008/0271774 A1 | 11/2008 | Kalkanoglu et al. |
| 2008/0302030 A1 | 12/2008 | Stancel et al. |
| 2008/0315061 A1 | 12/2008 | Fath |
| 2009/0000222 A1 | 1/2009 | Kalkanoglu et al. |
| 2009/0014057 A1 | 1/2009 | Croft et al. |
| 2009/0014058 A1 | 1/2009 | Croft et al. |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu et al. |
| 2009/0178350 A1 | 7/2009 | Kalkanoglu et al. |
| 2009/0229652 A1 | 9/2009 | Mapel et al. |
| 2009/0275247 A1 | 11/2009 | Richter et al. |
| 2010/0019580 A1 | 1/2010 | Croft et al. |
| 2010/0095618 A1 | 4/2010 | Edison et al. |
| 2010/0101634 A1 | 4/2010 | Frank et al. |
| 2010/0116325 A1 | 5/2010 | Nikoonahad |
| 2010/0131108 A1 | 5/2010 | Meyer |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0170169 A1 | 7/2010 | Railkar et al. |
| 2010/0186798 A1 | 7/2010 | Tormen et al. |
| 2010/0242381 A1 | 9/2010 | Jenkins |
| 2010/0313499 A1 | 12/2010 | Gangemi |
| 2010/0325976 A1 | 12/2010 | DeGenfelder et al. |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1 | 3/2011 | Livsey et al. |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0168238 A1 | 7/2011 | Metin et al. |
| 2011/0239555 A1 | 10/2011 | Cook et al. |
| 2011/0302859 A1 | 12/2011 | Crasnianski |
| 2011/0314753 A1 | 12/2011 | Farmer et al. |
| 2012/0034799 A1 | 2/2012 | Hunt |
| 2012/0060434 A1 | 3/2012 | Jacobs |
| 2012/0060902 A1 | 3/2012 | Drake |
| 2012/0085392 A1 | 4/2012 | Albert et al. |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0260977 A1 | 10/2012 | Stancel |
| 2012/0266942 A1 | 10/2012 | Komatsu et al. |
| 2012/0279150 A1 | 11/2012 | Pislkak et al. |
| 2012/0282437 A1 | 11/2012 | Clark et al. |
| 2012/0291848 A1 | 11/2012 | Sherman et al. |
| 2013/0008499 A1 | 1/2013 | Verger et al. |
| 2013/0014455 A1 | 1/2013 | Grieco |
| 2013/0118558 A1* | 5/2013 | Sherman ............... H01R 13/72 136/251 |
| 2013/0193769 A1 | 8/2013 | Mehta et al. |
| 2013/0247988 A1 | 9/2013 | Reese et al. |
| 2013/0284267 A1 | 10/2013 | Plug et al. |
| 2013/0306137 A1 | 11/2013 | Ko |
| 2014/0090697 A1 | 4/2014 | Rodrigues et al. |
| 2014/0150843 A1 | 6/2014 | Pearce et al. |
| 2014/0173997 A1 | 6/2014 | Jenkins |
| 2014/0179220 A1 | 6/2014 | Railkar et al. |
| 2014/0182222 A1 | 7/2014 | Kalkanoglu et al. |
| 2014/0208675 A1 | 7/2014 | Beerer et al. |
| 2014/0254776 A1 | 9/2014 | O'Connor et al. |
| 2014/0266289 A1 | 9/2014 | Della Sera et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0089895 A1 | 4/2015 | Leitch |
| 2015/0162459 A1 | 6/2015 | Lu et al. |
| 2015/0340516 A1 | 11/2015 | Kim et al. |
| 2015/0349173 A1 | 12/2015 | Morad et al. |
| 2016/0105144 A1 | 4/2016 | Haynes et al. |
| 2016/0142008 A1 | 5/2016 | Lopez et al. |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0159292 A1 | 6/2017 | Chihlas et al. |
| 2017/0179319 A1 | 6/2017 | Yamashita et al. |
| 2017/0179726 A1 | 6/2017 | Garrity et al. |
| 2017/0237390 A1 | 8/2017 | Hudson et al. |
| 2017/0331415 A1 | 11/2017 | Koppi et al. |
| 2018/0094438 A1 | 4/2018 | Wu et al. |
| 2018/0097472 A1 | 4/2018 | Anderson et al. |
| 2018/0115275 A1 | 4/2018 | Flanigan et al. |
| 2018/0254738 A1 | 9/2018 | Yang et al. |
| 2018/0294765 A1 | 10/2018 | Friedrich et al. |
| 2018/0351502 A1 | 12/2018 | Almy et al. |
| 2018/0367089 A1 | 12/2018 | Stutterheim et al. |
| 2019/0030867 A1 | 1/2019 | Sun et al. |
| 2019/0081436 A1 | 3/2019 | Onodi et al. |
| 2019/0123679 A1 | 4/2019 | Rodrigues et al. |
| 2019/0253022 A1 | 8/2019 | Hardar et al. |
| 2019/0305717 A1 | 10/2019 | Allen et al. |
| 2020/0006869 A1* | 1/2020 | Newman ............... H02G 15/113 |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0083619 A1 | 3/2021 | Hegedus |
| 2021/0115223 A1 | 4/2021 | Bonekamp et al. |
| 2021/0159353 A1 | 5/2021 | Li et al. |
| 2021/0301536 A1 | 9/2021 | Baggs et al. |
| 2021/0343886 A1 | 11/2021 | Sharenko et al. |
| 2022/0149213 A1 | 5/2022 | Mensink et al. |

FOREIGN PATENT DOCUMENTS

| | | |
|---|---|---|
| CN | 202797032 U | 3/2013 |
| CN | 217150978 U | 8/2022 |
| DE | 1958248 A1 | 11/1971 |
| EP | 1039361 A1 | 9/2000 |
| EP | 1837162 A1 | 9/2007 |
| EP | 1774372 A1 | 7/2011 |

(56) References Cited

FOREIGN PATENT DOCUMENTS

| | | | |
|---|---|---|---|
| EP | 2446481 A2 | 5/2012 | |
| EP | 2784241 A1 | 10/2014 | |
| EP | 3772175 A1 | 2/2021 | |
| FR | 2947099 A1 * | 12/2010 | ............. H02S 20/25 |
| JP | 10046767 A | 2/1998 | |
| JP | 2002-106151 A | 4/2002 | |
| JP | 2001-098703 A | 10/2002 | |
| JP | 2017-027735 A | 2/2017 | |
| JP | 2018053707 A | 4/2018 | |
| KR | 20090084060 A | 8/2009 | |
| KR | 10-1348283 B1 | 1/2014 | |
| KR | 10-2019-0000367 A | 1/2019 | |
| KR | 10-2253483 B1 | 5/2021 | |
| NL | 2026856 B1 | 6/2022 | |
| NO | 2015/133632 A1 | 9/2015 | |
| WO | 2010/151777 A2 | 12/2010 | |
| WO | 2011/049944 A1 | 4/2011 | |
| WO | 2018/000589 A1 | 1/2018 | |
| WO | 2019/201416 A1 | 10/2019 | |
| WO | 2020-159358 A1 | 8/2020 | |
| WO | 2021-247098 A1 | 12/2021 | |

OTHER PUBLICATIONS

Sunflare, Procducts: "Sunflare Develops Prototype For New Residential Solar Shingles"; 2019 <<sunflaresolar.com/news/sunflare-develops-prototype-for-new-residential-solar-shingles>> retrieved Feb. 2, 2021.

RGS Energy, 3.5KW Powerhouse 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing; <<https://www.owenscorning.com/en-us/roofing/tools/how-roofing-underlayment-helps-protect-your-home>> retrieved Nov. 1, 2021.

* cited by examiner

LOW PROFILE CONNECTOR FOR SOLAR ROOFING SYSTEMS

CROSS-REFERENCE TO RELATED APPLICATION

This application claims priority to U.S. provisional application No. 63/329,163, filed Apr. 8, 2022 and is incorporated by reference herein in its entirety.

FIELD

This disclosure relates generally to an electrical connector. More particularly, this disclosure relates to a low profile electrical connector such as, but not limited to, a low profile connector for use with solar panels.

BACKGROUND

Photovoltaic systems having photovoltaic modules are commonly installed on the roof of structures. Various electrical connections for the photovoltaic modules within the system are required to make the system work.

SUMMARY

The Claims, rather than the Summary, define covered embodiments of the present invention. The Summary is a high-level overview of various aspects of the invention, and introduces some concepts that are further described in the Detailed Description below. The Summary is not intended to identify key or essential features of the claimed subject matter, and also is not intended to be used in isolation to determine the scope of the claimed subject matter. Instead, the claimed subject matter should be understood by reference to appropriate portions of the Specification and drawings, as well as to each claim.

In some embodiments, the present invention provides a system, comprising: a plurality of photovoltaic modules installed above a roof deck, wherein the plurality of photovoltaic modules comprises at least a first photovoltaic module and a second photovoltaic module, wherein each of the plurality of photovoltaic modules comprises: a top surface; a bottom surface opposite the top surface; a plurality of solar cells; a first receptacle on the top surface, wherein the first receptacle comprises: a plurality of first non-conductive openings, and a plurality of first conductive members in the plurality of first non-conductive openings; and a second receptacle on the bottom surface, wherein the second receptacle comprises: a plurality of second non-conductive openings, and a plurality of second conductive members in the plurality of second non-conductive openings, wherein at least a portion of the second photovoltaic module overlaps at least a portion of the first photovoltaic module, wherein the first receptacle of the first photovoltaic module is in mechanical connection with the second receptacle of the second photovoltaic module, and wherein the first conductive members are in electrical communication with the second conductive members.

In some embodiments, a thickness of a connection of the first receptacle and the second receptacle is 1 mm to 20 mm.

In some embodiments, the system further comprises a cable comprising a plurality of wires connected to one of the first receptacle or the second receptacle.

In some embodiments, the wires of the plurality of wires of the cable are arranged linearly adjacent to each other.

In some embodiments, the cable has a thickness of 1 mm to 10 mm.

In some embodiments, each of the plurality of photovoltaic modules further comprises a side lap portion, wherein the first receptacle is on the side lap portion, and wherein the second receptacle is on the side lap portion.

In some embodiments, each of the photovoltaic module further comprises a headlap portion, wherein the first receptacle is on the headlap portion, and wherein the second receptacle is on the headlap portion.

In some embodiments, each of the first conductive members of the plurality of first conductive members comprises a conductive pin, and each of the second conductive members of the plurality of second conductive members comprises a conductive opening.

In some embodiments, each of the first conductive members of the plurality of first conductive members comprises a conductive opening, and each of the second conductive members of the plurality of second conductive members comprises a conductive pin.

In some embodiments, the plurality of first non-conductive openings and the plurality of second non-conductive openings are configured to prevent access to the plurality of first conductive members and the plurality of second conductive members in accordance with UL 6703.

In some embodiments, the first receptacle comprises a first housing, the second receptacle comprises a second housing, and at least a portion of the first housing on the first photovoltaic module surrounds at least a portion of the second housing on the second photovoltaic module.

In some embodiments, the first receptacle comprises a first housing, the second receptacle comprises a second housing, and at least a portion of the second housing on the second photovoltaic module surrounds at least a portion of the first housing on the first photovoltaic module.

In some embodiments, the first conductive members of the first photovoltaic module surround the second conductive members of the second photovoltaic module.

In some embodiments, the second conductive members of the second photovoltaic module surround the first conductive members of the first photovoltaic module.

In some embodiments, the present invention provides a photovoltaic module, comprising: a top surface; a bottom surface opposite the top surface; a plurality of solar cells; a first receptacle on the top surface, wherein the first receptacle comprises: a plurality of first non-conductive openings, and a plurality of first conductive members in the plurality of first non-conductive openings; and a second receptacle on the bottom surface, wherein the second receptacle comprises: a plurality of second non-conductive openings, and a plurality of second conductive members in the plurality of second non-conductive openings.

In some embodiments, the photovoltaic module further comprises a side lap portion, the first receptacle is on the side lap portion, and the second receptacle is on the side lap portion.

In some embodiments, the photovoltaic module further comprises a headlap portion, the first receptacle is on the headlap portion, and the second receptacle is on the headlap portion.

BRIEF DESCRIPTION OF THE FIGURES

References are made to the accompanying drawings that form a part of this disclosure and that illustrate embodiments in which the systems and methods described in this Specification can be practiced.

DETAILED DESCRIPTION

Electrical connectors for photovoltaic modules, such as those installed on the roof of structures, can be bulky. Embodiments of this disclosure are directed to electrical connectors having a low profile. In some embodiments, the low profile electrical connectors can have a reduced thickness relative to prior electrical connectors. In some embodiments, the electrical connectors described can be touch safe (e.g., impede or prevent access) and comply with UL 6703 when connected.

Figure 1:
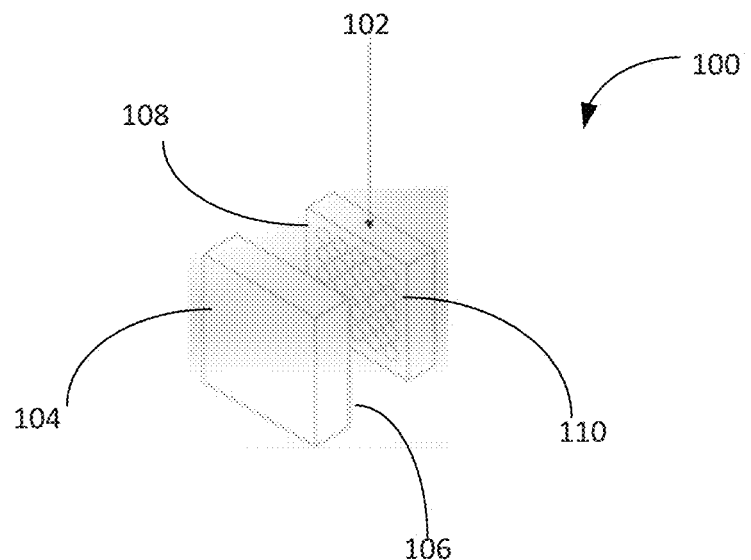
FIG. 1 shows a front perspective view of an electrical connector for a photovoltaic module, according to some embodiments.
Figure 2:
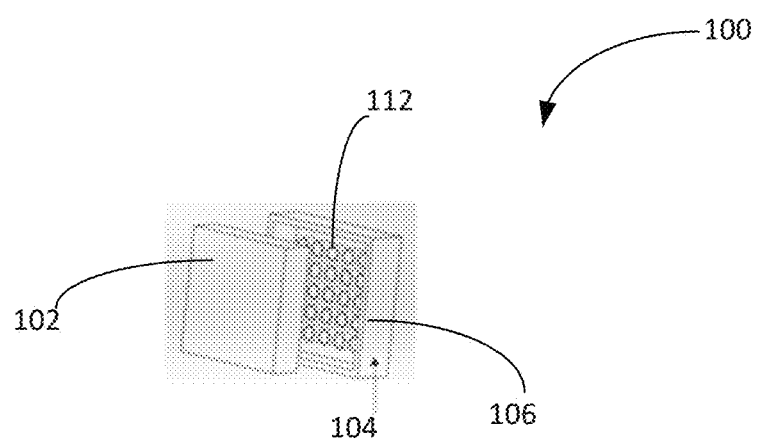
FIG. 2 shows a rear perspective view of the electrical connector for a photovoltaic module, according to some embodiments.

FIG. 1 shows a front perspective view of an electrical connector 100 for a photovoltaic module, according to some embodiments. FIG. 2 shows a rear perspective view of the electrical connector 100 for a photovoltaic module, according to some embodiments.

With reference to FIGS. 1 and 2 collectively, the electrical connector 100 includes a first receptacle 102 and a second receptacle 104. In some embodiments, a housing of the first receptacle 102 can be sized and shaped to fit into a housing of the second receptacle 104 when the first receptacle 102 is connected to the second receptacle 104. As such, outer dimensions of the housing of the first receptacle 102 can be selected so that a perimeter 106 of the housing of the second receptacle 104 surrounds at least a portion of a perimeter 108 of the first receptacle 102 when the first receptacle 102 is connected to the second receptacle 104. In some embodiments, the housing of the second receptacle 104 can be sized and shaped to fit into the housing of the first receptacle 102 when the second receptacle 104 is connected to the first receptacle 102. In such embodiments, outer dimensions of the housing of the second receptacle 104 can be selected so that the perimeter 108 of the housing of the first receptacle 102 surrounds at least a portion of the perimeter 106 of the second receptacle 104 when the first receptacle 102 is connected to the second receptacle 104.

The first receptacle 102 includes a plurality of non-conductive openings 110. The plurality of openings 110 are formed in a face of the first receptacle 102. In some embodiments, the first receptacle 102 can be referred to as a female receptacle.

The second receptacle 104 includes a plurality of non-conductive protrusions 112. The second receptacle 104 can be referred to as a male receptacle.

The plurality of openings 110 and the protrusions 112 are sized and shaped so that the openings 110 receive the protrusions 112 when connected. In some embodiments, the openings 110 can be square, circular, elliptical, star-shaped, or the like. In some embodiments, the protrusions 112 can be square, circular, elliptical, star-shaped, or the like. In some embodiments, the geometry of the openings 110 and the geometry of the protrusions 112 are selected to be similar so that the openings 110 and the protrusions 112 can mate.

In some embodiments, a number of the openings 110 and a number of the protrusions 112 matches. In some embodiments, the number of the openings 110 and the number of the protrusions 112 can be selected based on overall dimensions of the first receptacle 102 and the second receptacle 104. In some embodiments, the number of the openings 110 and the number of the protrusions 112 can also be based on an amount of current for which the electrical connector 100 is rated. In some embodiments, the number of the openings 110 and the number of the protrusions 112 controls dimensions of the first receptacle 102 and the second receptacle 104.

In the illustrated embodiment, the first receptacle 102 and the second receptacle 104 are both shown as being rectangular in geometry. It is to be appreciated that the geometry of the first receptacle 102 and the second receptacle 104 is not limited to rectangular. In some embodiments, the first receptacle 102 and the second receptacle 104 can be square, circular, elliptical, starshaped, or the like. The geometry of the first receptacle 102 and the second receptacle 104 are selected to be similar so that the first receptacle 102 and the second receptacle 104 can mate in a manner that the resulting connection has a limited thickness, such as less than 10 mm.

Figure 3:
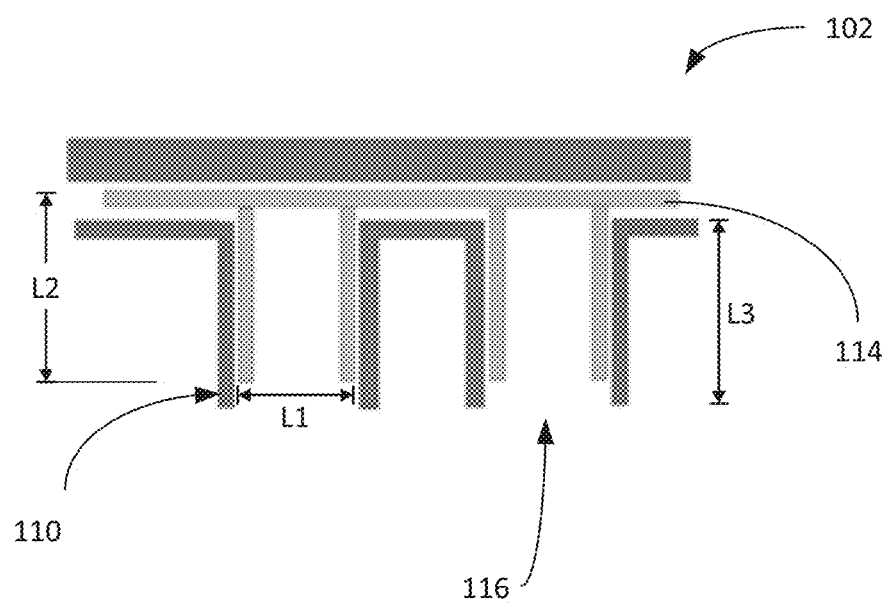
FIG. 3 shows a side sectional view of a portion of a first receptacle of the electrical connector of FIGS. 1-2, according to some embodiments.

FIG. 3 shows a side sectional view of a portion of the first receptacle 102, according to some embodiments. The first receptacle 102 includes the openings 110 and a conductor 114. The conductor 114 can include a plurality of conductive openings 116 made of the conductor 114 and disposed within the openings 110. In the illustrated embodiment, the conductor 114 is recessed within the openings 110 so that the conductor 114 is protected within the openings 110. It is to be appreciated that a size L1 of the openings 116 is selected to be less than a size L2 of the openings 110. The openings 116 are sized to receive a conductor (FIG. 4) of the second receptacle 104.

In some embodiments, the conductor 114 includes an electrical wire. In some embodiments, the conductor 114 includes bussing. In some embodiments, the conductor 114 includes copper, copper-covered steel, high strength copper alloys, aluminum, suitable combinations thereof, or the like.

As discussed above, the geometry of the openings 110. In some embodiments, the openings 110 include a first length L1. In some embodiments, the length L1 can be selected based on a dimension of the corresponding protrusions 112. The conductor 114 extends a length L2 within the openings 110. In some embodiments, the openings 110 have a length L3. In some embodiments, the length L2 is less than the length L3. In some embodiments, the length L3 can be the same as the length L2 such that an end of the conductor 114 is adjacent an end of the openings 110.

Figure 4:
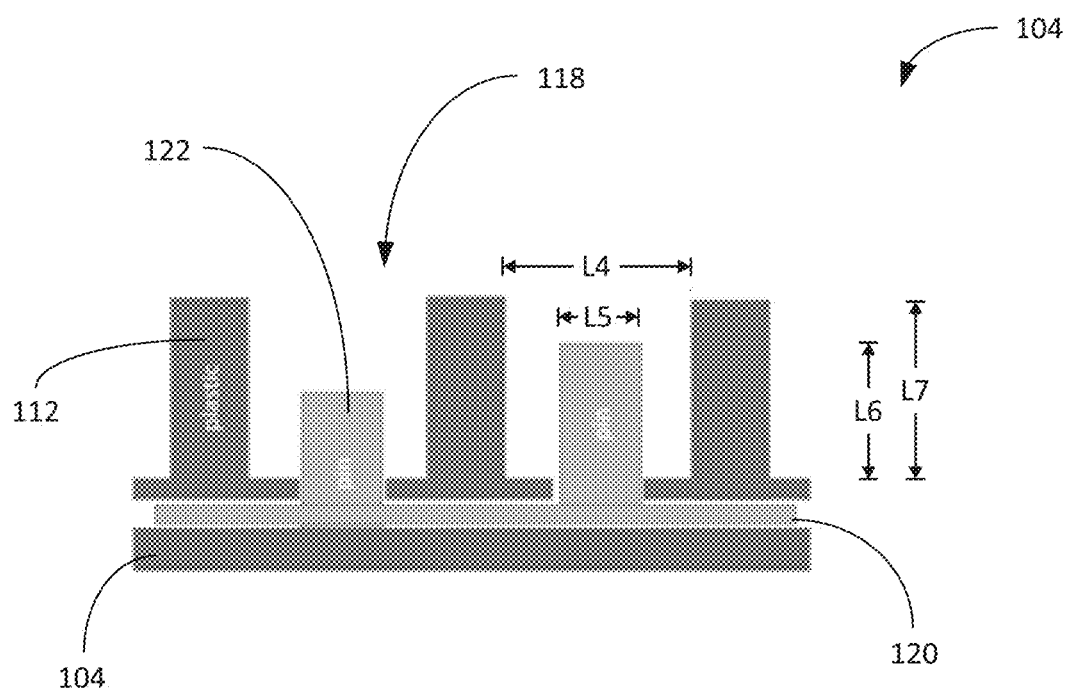
FIG. 4 shows a side sectional view of a portion of a second receptacle of the electrical connector of FIGS. 1-2, according to some embodiments.

FIG. 4 shows a side sectional view of a portion of the second receptacle 104, according to some embodiments. The second receptacle 104 includes the protrusions 112. Openings 118 are formed between the protrusions 112. The second receptacle 104 includes a conductor 120. The conductor 120 can include a plurality of conductive members or pins 122 made of the conductor 120 and disposed within the openings 118. In some embodiments, the conductor 120 is recessed within the openings 118 so that the conductor 120 is protected within the openings 118. The members 122 are sized to be inserted into the openings 116 (FIG. 3) of the first receptacle 102 when the second receptacle 104 is connected to the first receptacle 102. In some embodiments, the conductor 120 includes an electrical wire. In some embodiments, the conductor 120 includes bussing. In some embodiments, the conductor 120 includes copper, copper-covered steel, high strength copper alloys, aluminum, suitable combinations thereof, or the like. In some embodiments, the members 122 can be referred to as pins or the like.

In some embodiments, the second receptacle 104 includes a length L4 between the protrusions 112. The members 122 can have a length L5. In some embodiments, the length L4 is larger than the length L5. In some embodiments, the length L4 is larger than the length L1 (FIG. 3). In some embodiments, the members 122 have a length L6. In some embodiments, the protrusions 112 have a length L7. In some embodiments, the length L6 is smaller than the length L7. In some embodiments, the length L6 is larger than the length L7. In some embodiments, the length L7 can be based on the length L3 (FIG. 3) so that the first receptacle 102 and the second receptacle 104 have a low profile when connected together.

Figure 5:
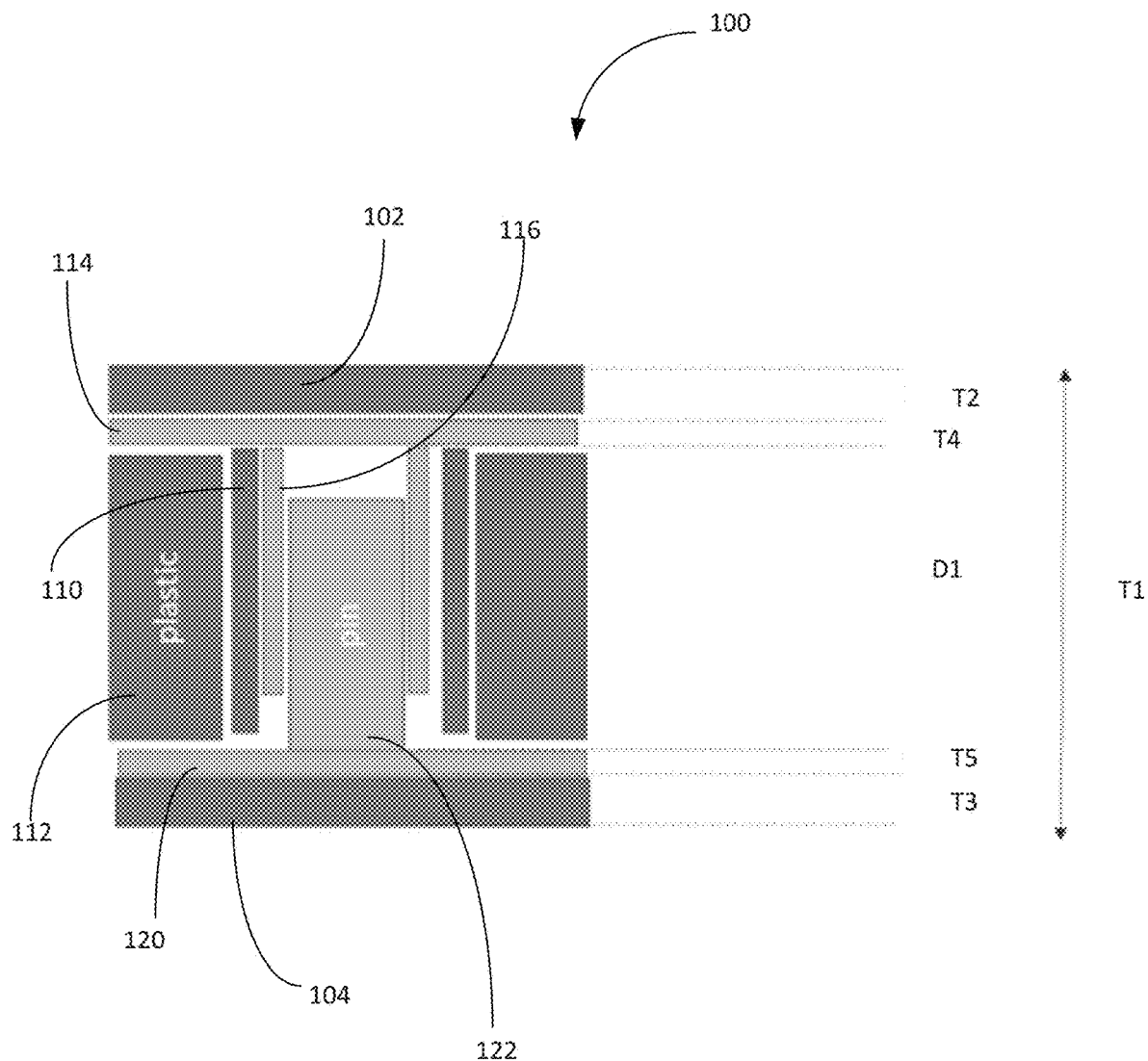
FIG. 5 shows a side sectional view of the electrical connector when connected, according to some embodiments.

FIG. 5 shows a side sectional view of the electrical connector 100 when connected. In the connected configuration, the members 122 are disposed within the openings 116. In this configuration, the conductor 114 and the conductor 120 are in electrical communication. As illustrated, the openings 110 and the protrusions 112 surround the electrical connection. This can prevent electrical contact through insertion of a probe such as, for example, to meet the requirements of UL 6703.

In some embodiments, a thickness T1 of the electrical connector 100 when connected is less than 25 mm. In some embodiments, the thickness T1 of the electrical connector 100 when connected is less than 24 mm. In some embodiments, the thickness T1 of the electrical connector 100 when connected is less than 23 mm. In some embodiments, the thickness T1 of the electrical connector 100 when connected is less than 22 mm. In some embodiments, the thickness T1 of the electrical connector 100 when connected is less than 21 mm. In some embodiments, the thickness T1 of the electrical connector 100 when connected is less than 20 mm. In some embodiments, the thickness T1 of the electrical connector 100 when connected is less than 19 mm. In some embodiments, the thickness T1 of the electrical connector 100 when connected is less than 18 mm. In some embodiments, the thickness T1 of the electrical connector 100 when connected is less than 17 mm. In some embodiments, the thickness T1 of the electrical connector 100 when connected is less than 16 mm. In some embodiments, the thickness T1 of the electrical connector 100 when connected is less than 15 mm. In some embodiments, the thickness T1 of the electrical connector 100 when connected is less than 14 mm. In some embodiments, the thickness T1 of the electrical connector 100 when connected is less than 13 mm. In some embodiments, the thickness T1 of the electrical connector 100 when connected is less than 12 mm. In some embodiments, the thickness T1 of the electrical connector 100 when connected is less than 11 mm. In some embodiments, the thickness T1 of the electrical connector 100 when connected is less than 10 mm. In some embodiments, the thickness T1 of the electrical connector 100 when connected is less than 9 mm. In some embodiments, the thickness T1 of the electrical connector 100 when connected is less than 8 mm. In some embodiments, the thickness T1 of the electrical connector 100 when connected is less than 7 mm. In some embodiments, the thickness T1 of the electrical connector 100 when connected is less than 6 mm. In some embodiments, the thickness T1 of the electrical connector 100 when connected is less than 5 mm. In some embodiments, the thickness T1 of the electrical connector 100 when connected is less than 4 mm. In some embodiments, the thickness T1 of the electrical connector 100 when connected is less than 3 mm. In some embodiments, the thickness T1 of the electrical connector 100 when connected is less than 2 mm. In some embodiments, the thickness T1 of the electrical connector 100 when connected is less than 1 mm. In some embodiments, the thickness T1 of the electrical connector 100 when connected is greater than 1 mm.

In some embodiments, the thickness T1 of the electrical connector 100 when connected is 1 mm to 25 mm. In some embodiments, the thickness T1 of the electrical connector 100 when connected is 1 mm to 24 mm. In some embodiments, the thickness T1 of the electrical connector 100 when connected is 1 mm to 23 mm. In some embodiments, the thickness T1 of the electrical connector 100 when connected is 1 mm to 22 mm. In some embodiments, the thickness T1 of the electrical connector 100 when connected is 1 mm to 21 mm. In some embodiments, the thickness T1 of the electrical connector 100 when connected is 1 mm to 20 mm. In some embodiments, the thickness T1 of the electrical connector 100 when connected is 1 mm to 19 mm. In some embodiments, the thickness T1 of the electrical connector 100 when connected is 1 mm to 18 mm. In some embodiments, the thickness T1 of the electrical connector 100 when connected is 1 mm to 17 mm. In some embodiments, the thickness T1 of the electrical connector 100 when connected is 1 mm to 16 mm. In some embodiments, the thickness T1 of the electrical connector 100 when connected is 1 mm to 15 mm. In some embodiments, the thickness T1 of the electrical connector 100 when connected is 1 mm to 14 mm. In some embodiments, the thickness T1 of the electrical connector 100 when connected is 1 mm to 13 mm. In some embodiments, the thickness T1 of the electrical connector 100 when connected is 1 mm to 12 mm. In some embodiments, the thickness T1 of the electrical connector 100 when connected is 1 mm to 11 mm. In some embodiments, the thickness T1 of the electrical connector 100 when connected is 1 mm to 10 mm. In some embodiments, the thickness T1 of the electrical connector 100 when connected is 1 mm to 9 mm. In some embodiments, the thickness T1 of the electrical connector 100 when connected is 1 mm to 8 mm. In some embodiments, the thickness T1 of the electrical connector 100 when connected is 1 mm to 7 mm. In some embodiments, the thickness T1 of the electrical connector 100 when connected is 1 mm to 6 mm. In some embodiments, the thickness T1 of the electrical connector 100 when connected is 1 mm to 5 mm. In some embodiments, the thickness T1 of the electrical connector 100 when connected is 1 mm to 4 mm. In some embodiments, the thickness T1 of the electrical connector 100 when connected is 1 mm to 3 mm. In some embodiments, the thickness T1 of the electrical connector 100 when connected is 1 mm to 2 mm.

In some embodiments, the thickness T1 of the electrical connector 100 when connected is 2 mm to 25 mm. In some embodiments, the thickness T1 of the electrical connector 100 when connected is 2 mm to 24 mm. In some embodiments, the thickness T1 of the electrical connector 100 when connected is 2 mm to 23 mm. In some embodiments, the thickness T1 of the electrical connector 100 when connected is 2 mm to 22 mm. In some embodiments, the thickness T1 of the electrical connector 100 when connected is 2 mm to 21 mm. In some embodiments, the thickness T1 of the electrical connector 100 when connected is 2 mm to 20 mm. In some embodiments, the thickness T1 of the electrical connector 100 when connected is 2 mm to 19 mm. In some embodiments, the thickness T1 of the electrical connector 100 when connected is 2 mm to 18 mm. In some embodiments, the thickness T1 of the electrical connector 100 when connected is 2 mm to 17 mm. In some embodiments, the thickness T1 of the electrical connector 100 when connected is 2 mm to 16 mm. In some embodiments, the thickness T1 of the electrical connector 100 when connected is 2 mm to 15 mm. In some embodiments, the thickness T1 of the electrical connector 100 when connected is 2 mm to 14 mm. In some embodiments, the thickness T1 of the electrical connector 100 when connected is 2 mm to 13 mm. In some embodiments, the thickness T1 of the electrical connector 100 when connected is 2 mm to 12 mm. In some embodiments, the thickness T1 of the electrical connector 100 when connected is 2 mm to 11 mm. In some embodiments, the thickness T1 of the electrical connector 100 when connected is 2 mm to 10 mm. In some embodiments, the thickness T1 of the electrical connector 100 when connected is 2 mm to 9 mm. In some embodiments, the thickness T1 of the electrical connector 100 when connected is 2 mm to 8 mm. In some embodiments, the thickness T1 of the electrical connector 100 when connected is 2 mm to 7 mm. In some embodiments, the thickness T1 of the electrical connector 100 when connected is 2 mm to 6 mm. In some embodiments, the thickness T1 of the electrical connector 100 when connected is 2 mm to 5 mm. In some embodiments, the thickness T1 of the electrical connector 100 when connected is 2 mm to 4 mm. In some embodiments, the thickness T1 of the electrical connector 100 when connected is 2 mm to 3 mm.

In some embodiments, the thickness T1 of the electrical connector 100 when connected is 3 mm to 25 mm. In some embodiments, the thickness T1 of the electrical connector 100 when connected is 3 mm to 24 mm. In some embodiments, the thickness T1 of the electrical connector 100 when connected is 3 mm to 23 mm. In some embodiments, the thickness T1 of the electrical connector 100 when connected is 3 mm to 22 mm. In some embodiments, the thickness T1 of the electrical connector 100 when connected is 3 mm to 21 mm. In some embodiments, the thickness T1 of the electrical connector 100 when connected is 3 mm to 20 mm. In some embodiments, the thickness T1 of the electrical connector 100 when connected is 3 mm to 19 mm. In some embodiments, the thickness T1 of the electrical connector 100 when connected is 3 mm to 18 mm. In some embodiments, the thickness T1 of the electrical connector 100 when connected is 3 mm to 17 mm. In some embodiments, the thickness T1 of the electrical connector 100 when connected is 3 mm to 16 mm. In some embodiments, the thickness T1 of the electrical connector 100 when connected is 3 mm to 15 mm. In some embodiments, the thickness T1 of the electrical connector 100 when connected is 3 mm to 14 mm. In some embodiments, the thickness T1 of the electrical connector 100 when connected is 3 mm to 13 mm. In some embodiments, the thickness T1 of the electrical connector 100 when connected is 3 mm to 12 mm. In some embodiments, the thickness T1 of the electrical connector 100 when connected is 3 mm to 11 mm. In some embodiments, the thickness T1 of the electrical connector 100 when connected is 3 mm to 10 mm. In some embodiments, the thickness T1 of the electrical connector 100 when connected is 3 mm to 9 mm. In some embodiments, the thickness T1 of the electrical connector 100 when connected is 3 mm to 8 mm. In some embodiments, the thickness T1 of the electrical connector 100 when connected is 3 mm to 7 mm. In some embodiments, the thickness T1 of the electrical connector 100 when connected is 3 mm to 6 mm. In some embodiments, the thickness T1 of the electrical connector 100 when connected is 3 mm to 5 mm. In some embodiments, the thickness T1 of the electrical connector 100 when connected is 3 mm to 4 mm.

In some embodiments, the thickness T1 of the electrical connector 100 when connected is 4 mm to 25 mm. In some embodiments, the thickness T1 of the electrical connector 100 when connected is 4 mm to 24 mm. In some embodiments, the thickness T1 of the electrical connector 100 when connected is 4 mm to 23 mm. In some embodiments, the thickness T1 of the electrical connector 100 when connected is 4 mm to 22 mm. In some embodiments, the thickness T1 of the electrical connector 100 when connected is 4 mm to 21 mm. In some embodiments, the thickness T1 of the electrical connector 100 when connected is 4 mm to 20 mm. In some embodiments, the thickness T1 of the electrical connector 100 when connected is 4 mm to 19 mm. In some embodiments, the thickness T1 of the electrical connector 100 when connected is 4 mm to 18 mm. In some embodiments, the thickness T1 of the electrical connector 100 when connected is 4 mm to 17 mm. In some embodiments, the thickness T1 of the electrical connector 100 when connected is 4 mm to 16 mm. In some embodiments, the thickness T1 of the electrical connector 100 when connected is 4 mm to 15 mm. In some embodiments, the thickness T1 of the electrical connector 100 when connected is 4 mm to 14 mm. In some embodiments, the thickness T1 of the electrical connector 100 when connected is 4 mm to 13 mm. In some embodiments, the thickness T1 of the electrical connector 100 when connected is 4 mm to 12 mm. In some embodiments, the thickness T1 of the electrical connector 100 when connected is 4 mm to 11 mm. In some embodiments, the thickness T1 of the electrical connector 100 when connected is 4 mm to 10 mm. In some embodiments, the thickness T1 of the electrical connector 100 when connected is 4 mm to 9 mm. In some embodiments, the thickness T1 of the electrical connector 100 when connected is 4 mm to 8 mm. In some embodiments, the thickness T1 of the electrical connector 100 when connected is 4 mm to 7 mm. In some embodiments, the thickness T1 of the electrical connector 100 when connected is 4 mm to 6 mm. In some embodiments, the thickness T1 of the electrical connector 100 when connected is 4 mm to 5 mm.

In some embodiments, the thickness T1 of the electrical connector 100 when connected is 5 mm to 25 mm. In some embodiments, the thickness T1 of the electrical connector 100 when connected is 5 mm to 24 mm. In some embodiments, the thickness T1 of the electrical connector 100 when connected is 5 mm to 23 mm. In some embodiments, the thickness T1 of the electrical connector 100 when connected is 5 mm to 22 mm. In some embodiments, the thickness T1 of the electrical connector 100 when connected is 5 mm to 21 mm. In some embodiments, the thickness T1 of the electrical connector 100 when connected is 5 mm to 20 mm. In some embodiments, the thickness T1 of the electrical connector 100 when connected is 5 mm to 19 mm. In some embodiments, the thickness T1 of the electrical connector 100 when connected is 5 mm to 18 mm. In some embodiments, the thickness T1 of the electrical connector 100 when connected is 5 mm to 17 mm. In some embodiments, the thickness T1 of the electrical connector 100 when connected is 5 mm to 16 mm. In some embodiments, the thickness T1 of the electrical connector 100 when connected is 5 mm to 15 mm. In some embodiments, the thickness T1 of the electrical connector 100 when connected is 5 mm to 14 mm. In some embodiments, the thickness T1 of the electrical connector 100 when connected is 5 mm to 13 mm. In some embodiments, the thickness T1 of the electrical connector 100 when connected is 5 mm to 12 mm. In some embodiments, the thickness T1 of the electrical connector 100 when connected is 5 mm to 11 mm. In some embodiments, the thickness T1 of the electrical connector 100 when connected is 5 mm to 10 mm. In some embodiments, the thickness T1 of the electrical connector 100 when connected is 5 mm to 9 mm. In some embodiments, the thickness T1 of the electrical connector 100 when connected is 5 mm to 8 mm. In some embodiments, the thickness T1 of the electrical connector 100 when connected is 5 mm to 7 mm. In some embodiments, the thickness T1 of the electrical connector 100 when connected is 5 mm to 6 mm.

In some embodiments, the thickness T1 of the electrical connector 100 when connected is 6 mm to 25 mm. In some embodiments, the thickness T1 of the electrical connector 100 when connected is 6 mm to 24 mm. In some embodiments, the thickness T1 of the electrical connector 100 when connected is 6 mm to 23 mm. In some embodiments, the thickness T1 of the electrical connector 100 when connected is 6 mm to 22 mm. In some embodiments, the thickness T1 of the electrical connector 100 when connected is 6 mm to 21 mm. In some embodiments, the thickness T1 of the electrical connector 100 when connected is 6 mm to 20 mm. In some embodiments, the thickness T1 of the electrical connector 100 when connected is 6 mm to 19 mm. In some embodiments, the thickness T1 of the electrical connector 100 when connected is 6 mm to 18 mm. In some embodiments, the thickness T1 of the electrical connector 100 when connected is 6 mm to 17 mm. In some embodiments, the thickness T1 of the electrical connector 100 when connected is 6 mm to 16 mm. In some embodiments, the thickness T1 of the electrical connector 100 when connected is 6 mm to 15 mm. In some embodiments, the thickness T1 of the electrical connector 100 when connected is 6 mm to 14 mm. In some embodiments, the thickness T1 of the electrical connector 100 when connected is 6 mm to 13 mm. In some embodiments, the thickness T1 of the electrical connector 100 when connected is 6 mm to 12 mm. In some embodiments, the thickness T1 of the electrical connector 100 when connected is 6 mm to 11 mm. In some embodiments, the thickness T1 of the electrical connector 100 when connected is 6 mm to 10 mm. In some embodiments, the thickness T1 of the electrical connector 100 when connected is 6 mm to 9 mm. In some embodiments, the thickness T1 of the electrical connector 100 when connected is 6 mm to 8 mm. In some embodiments, the thickness T1 of the electrical connector 100 when connected is 6 mm to 7 mm.

In some embodiments, the thickness T1 of the electrical connector 100 when connected is 7 mm to 25 mm. In some embodiments, the thickness T1 of the electrical connector 100 when connected is 7 mm to 24 mm. In some embodiments, the thickness T1 of the electrical connector 100 when connected is 7 mm to 23 mm. In some embodiments, the thickness T1 of the electrical connector 100 when connected is 7 mm to 22 mm. In some embodiments, the thickness T1 of the electrical connector 100 when connected is 7 mm to 21 mm. In some embodiments, the thickness T1 of the electrical connector 100 when connected is 7 mm to 20 mm. In some embodiments, the thickness T1 of the electrical connector 100 when connected is 7 mm to 19 mm. In some embodiments, the thickness T1 of the electrical connector 100 when connected is 7 mm to 18 mm. In some embodiments, the thickness T1 of the electrical connector 100 when connected is 7 mm to 17 mm. In some embodiments, the thickness T1 of the electrical connector 100 when connected is 7 mm to 16 mm. In some embodiments, the thickness T1 of the electrical connector 100 when connected is 7 mm to 15 mm. In some embodiments, the thickness T1 of the electrical connector 100 when connected is 7 mm to 14 mm. In some embodiments, the thickness T1 of the electrical connector 100 when connected is 7 mm to 13 mm. In some embodiments, the thickness T1 of the electrical connector 100 when connected is 7 mm to 12 mm. In some embodiments, the thickness T1 of the electrical connector 100 when connected is 7 mm to 11 mm. In some embodiments, the thickness T1 of the electrical connector 100 when connected is 7 mm to 10 mm. In some embodiments, the thickness T1 of the electrical connector 100 when connected is 7 mm to 9 mm. In some embodiments, the thickness T1 of the electrical connector 100 when connected is 7 mm to 8 mm.

In some embodiments, the thickness T1 of the electrical connector 100 when connected is 8 mm to 25 mm. In some embodiments, the thickness T1 of the electrical connector 100 when connected is 8 mm to 24 mm. In some embodiments, the thickness T1 of the electrical connector 100 when connected is 8 mm to 23 mm. In some embodiments, the thickness T1 of the electrical connector 100 when connected is 8 mm to 22 mm. In some embodiments, the thickness T1 of the electrical connector 100 when connected is 8 mm to 21 mm. In some embodiments, the thickness T1 of the electrical connector 100 when connected is 8 mm to 20 mm. In some embodiments, the thickness T1 of the electrical connector 100 when connected is 8 mm to 19 mm. In some embodiments, the thickness T1 of the electrical connector 100 when connected is 8 mm to 18 mm. In some embodiments, the thickness T1 of the electrical connector 100 when connected is 8 mm to 17 mm. In some embodiments, the thickness T1 of the electrical connector 100 when connected is 8 mm to 16 mm. In some embodiments, the thickness T1 of the electrical connector 100 when connected is 8 mm to 15 mm. In some embodiments, the thickness T1 of the electrical connector 100 when connected is 8 mm to 14 mm. In some embodiments, the thickness T1 of the electrical connector 100 when connected is 8 mm to 13 mm. In some embodiments, the thickness T1 of the electrical connector 100 when connected is 8 mm to 12 mm. In some embodiments, the thickness T1 of the electrical connector 100 when connected is 8 mm to 11 mm. In some embodiments, the thickness T1 of the electrical connector 100 when connected is 8 mm to 10 mm. In some embodiments, the thickness T1 of the electrical connector 100 when connected is 8 mm to 9 mm.

In some embodiments, the thickness T1 of the electrical connector 100 when connected is 9 mm to 25 mm. In some embodiments, the thickness T1 of the electrical connector 100 when connected is 9 mm to 24 mm. In some embodiments, the thickness T1 of the electrical connector 100 when connected is 9 mm to 23 mm. In some embodiments, the thickness T1 of the electrical connector 100 when connected is 9 mm to 22 mm. In some embodiments, the thickness T1 of the electrical connector 100 when connected is 9 mm to 21 mm. In some embodiments, the thickness T1 of the electrical connector 100 when connected is 9 mm to 20 mm. In some embodiments, the thickness T1 of the electrical connector 100 when connected is 9 mm to 19 mm. In some embodiments, the thickness T1 of the electrical connector 100 when connected is 9 mm to 18 mm. In some embodiments, the thickness T1 of the electrical connector 100 when connected is 9 mm to 17 mm. In some embodiments, the thickness T1 of the electrical connector 100 when connected is 9 mm to 16 mm. In some embodiments, the thickness T1 of the electrical connector 100 when connected is 9 mm to 15 mm. In some embodiments, the thickness T1 of the electrical connector 100 when connected is 9 mm to 14 mm. In some embodiments, the thickness T1 of the electrical connector 100 when connected is 9 mm to 13 mm. In some embodiments, the thickness T1 of the electrical connector 100 when connected is 9 mm to 12 mm. In some embodiments, the thickness T1 of the electrical connector 100 when connected is 9 mm to 11 mm. In some embodiments, the thickness T1 of the electrical connector 100 when connected is 9 mm to 10 mm.

In some embodiments, the thickness T1 of the electrical connector 100 when connected is 10 mm to 25 mm. In some embodiments, the thickness T1 of the electrical connector 100 when connected is 10 mm to 24 mm. In some embodiments, the thickness T1 of the electrical connector 100 when connected is 10 mm to 23 mm. In some embodiments, the thickness T1 of the electrical connector 100 when connected is 10 mm to 22 mm. In some embodiments, the thickness T1 of the electrical connector 100 when connected is 10 mm to 21 mm. In some embodiments, the thickness T1 of the electrical connector 100 when connected is 10 mm to 20 mm. In some embodiments, the thickness T1 of the electrical connector 100 when connected is 10 mm to 19 mm. In some embodiments, the thickness T1 of the electrical connector 100 when connected is 10 mm to 18 mm. In some embodiments, the thickness T1 of the electrical connector 100 when connected is 10 mm to 17 mm. In some embodiments, the thickness T1 of the electrical connector 100 when connected is 10 mm to 16 mm. In some embodiments, the thickness T1 of the electrical connector 100 when connected is 10 mm to 15 mm. In some embodiments, the thickness T1 of the electrical connector 100 when connected is 10 mm to 14 mm. In some embodiments, the thickness T1 of the electrical connector 100 when connected is 10 mm to 13 mm. In some embodiments, the thickness T1 of the electrical connector 100 when connected is 10 mm to 12 mm. In some embodiments, the thickness T1 of the electrical connector 100 when connected is 10 mm to 11 mm.

In some embodiments, the thickness T1 of the electrical connector 100 when connected is 11 mm to 25 mm. In some embodiments, the thickness T1 of the electrical connector 100 when connected is 11 mm to 24 mm. In some embodiments, the thickness T1 of the electrical connector 100 when connected is 11 mm to 23 mm. In some embodiments, the thickness T1 of the electrical connector 100 when connected is 11 mm to 22 mm. In some embodiments, the thickness T1 of the electrical connector 100 when connected is 11 mm to 21 mm. In some embodiments, the thickness T1 of the electrical connector 100 when connected is 11 mm to 20 mm. In some embodiments, the thickness T1 of the electrical connector 100 when connected is 11 mm to 19 mm. In some embodiments, the thickness T1 of the electrical connector 100 when connected is 11 mm to 18 mm. In some embodiments, the thickness T1 of the electrical connector 100 when connected is 11 mm to 17 mm. In some embodiments, the thickness T1 of the electrical connector 100 when connected is 11 mm to 16 mm. In some embodiments, the thickness T1 of the electrical connector 100 when connected is 11 mm to 15 mm. In some embodiments, the thickness T1 of the electrical connector 100 when connected is 11 mm to 14 mm. In some embodiments, the thickness T1 of the electrical connector 100 when connected is 11 mm to 13 mm. In some embodiments, the thickness T1 of the electrical connector 100 when connected is 11 mm to 12 mm.

In some embodiments, the thickness T1 of the electrical connector 100 when connected is 12 mm to 25 mm. In some embodiments, the thickness T1 of the electrical connector 100 when connected is 12 mm to 24 mm. In some embodiments, the thickness T1 of the electrical connector 100 when connected is 12 mm to 23 mm. In some embodiments, the thickness T1 of the electrical connector 100 when connected is 12 mm to 22 mm. In some embodiments, the thickness T1 of the electrical connector 100 when connected is 12 mm to 21 mm. In some embodiments, the thickness T1 of the electrical connector 100 when connected is 12 mm to 20 mm. In some embodiments, the thickness T1 of the electrical connector 100 when connected is 12 mm to 19 mm. In some embodiments, the thickness T1 of the electrical connector 100 when connected is 12 mm to 18 mm. In some embodiments, the thickness T1 of the electrical connector 100 when connected is 12 mm to 17 mm. In some embodiments, the thickness T1 of the electrical connector 100 when connected is 12 mm to 16 mm. In some embodiments, the thickness T1 of the electrical connector 100 when connected is 12 mm to 15 mm. In some embodiments, the thickness T1 of the electrical connector 100 when connected is 12 mm to 14 mm. In some embodiments, the thickness T1 of the electrical connector 100 when connected is 12 mm to 13 mm.

In some embodiments, the thickness T1 of the electrical connector 100 when connected is 13 mm to 25 mm. In some embodiments, the thickness T1 of the electrical connector 100 when connected is 13 mm to 24 mm. In some embodiments, the thickness T1 of the electrical connector 100 when connected is 13 mm to 23 mm. In some embodiments, the thickness T1 of the electrical connector 100 when connected is 13 mm to 22 mm. In some embodiments, the thickness T1 of the electrical connector 100 when connected is 13 mm to 21 mm. In some embodiments, the thickness T1 of the electrical connector 100 when connected is 13 mm to 20 mm. In some embodiments, the thickness T1 of the electrical connector 100 when connected is 13 mm to 19 mm. In some embodiments, the thickness T1 of the electrical connector 100 when connected is 13 mm to 18 mm. In some embodiments, the thickness T1 of the electrical connector 100 when connected is 13 mm to 17 mm. In some embodiments, the thickness T1 of the electrical connector 100 when connected is 13 mm to 16 mm. In some embodiments, the thickness T1 of the electrical connector 100 when connected is 13 mm to 15 mm. In some embodiments, the thickness T1 of the electrical connector 100 when connected is 13 mm to 14 mm.

In some embodiments, the thickness T1 of the electrical connector 100 when connected is 14 mm to 25 mm. In some embodiments, the thickness T1 of the electrical connector 100 when connected is 14 mm to 24 mm. In some embodiments, the thickness T1 of the electrical connector 100 when connected is 14 mm to 23 mm. In some embodiments, the thickness T1 of the electrical connector 100 when connected is 14 mm to 22 mm. In some embodiments, the thickness T1 of the electrical connector 100 when connected is 14 mm to 21 mm. In some embodiments, the thickness T1 of the electrical connector 100 when connected is 14 mm to 20 mm. In some embodiments, the thickness T1 of the electrical connector 100 when connected is 14 mm to 19 mm. In some embodiments, the thickness T1 of the electrical connector 100 when connected is 14 mm to 18 mm. In some embodiments, the thickness T1 of the electrical connector 100 when connected is 14 mm to 17 mm. In some embodiments, the thickness T1 of the electrical connector 100 when connected is 14 mm to 16 mm. In some embodiments, the thickness T1 of the electrical connector 100 when connected is 14 mm to 15 mm.

In some embodiments, the thickness T1 of the electrical connector 100 when connected is 15 mm to 25 mm. In some embodiments, the thickness T1 of the electrical connector 100 when connected is 15 mm to 24 mm. In some embodiments, the thickness T1 of the electrical connector 100 when connected is 15 mm to 23 mm. In some embodiments, the thickness T1 of the electrical connector 100 when connected is 15 mm to 22 mm. In some embodiments, the thickness T1 of the electrical connector 100 when connected is 15 mm to 21 mm. In some embodiments, the thickness T1 of the electrical connector 100 when connected is 15 mm to 20 mm. In some embodiments, the thickness T1 of the electrical connector 100 when connected is 15 mm to 19 mm. In some embodiments, the thickness T1 of the electrical connector 100 when connected is 15 mm to 18 mm. In some embodiments, the thickness T1 of the electrical connector 100 when connected is 15 mm to 17 mm. In some embodiments, the thickness T1 of the electrical connector 100 when connected is 15 mm to 16 mm.

In some embodiments, the thickness T1 of the electrical connector 100 when connected is 16 mm to 25 mm. In some embodiments, the thickness T1 of the electrical connector 100 when connected is 16 mm to 24 mm. In some embodiments, the thickness T1 of the electrical connector 100 when connected is 16 mm to 23 mm. In some embodiments, the thickness T1 of the electrical connector 100 when connected is 16 mm to 22 mm. In some embodiments, the thickness T1 of the electrical connector 100 when connected is 16 mm to 21 mm. In some embodiments, the thickness T1 of the electrical connector 100 when connected is 16 mm to 20 mm. In some embodiments, the thickness T1 of the electrical connector 100 when connected is 16 mm to 19 mm. In some embodiments, the thickness T1 of the electrical connector 100 when connected is 16 mm to 18 mm. In some embodiments, the thickness T1 of the electrical connector 100 when connected is 16 mm to 17 mm.

In some embodiments, the thickness T1 of the electrical connector 100 when connected is 17 mm to 25 mm. In some embodiments, the thickness T1 of the electrical connector 100 when connected is 17 mm to 24 mm. In some embodiments, the thickness T1 of the electrical connector 100 when connected is 17 mm to 23 mm. In some embodiments, the thickness T1 of the electrical connector 100 when connected is 17 mm to 21 mm. In some embodiments, the thickness T1 of the electrical connector 100 when connected is 17 mm to 21 mm. In some embodiments, the thickness T1 of the electrical connector 100 when connected is 17 mm to 20 mm. In some embodiments, the thickness T1 of the electrical connector 100 when connected is 17 mm to 19 mm. In some embodiments, the thickness T1 of the electrical connector 100 when connected is 17 mm to 18 mm.

In some embodiments, the thickness T1 of the electrical connector 100 when connected is 18 mm to 25 mm. In some embodiments, the thickness T1 of the electrical connector 100 when connected is 18 mm to 24 mm. In some embodiments, the thickness T1 of the electrical connector 100 when connected is 18 mm to 23 mm. In some embodiments, the thickness T1 of the electrical connector 100 when connected is 18 mm to 22 mm. In some embodiments, the thickness T1 of the electrical connector 100 when connected is 18 mm to 21 mm. In some embodiments, the thickness T1 of the electrical connector 100 when connected is 18 mm to 20 mm. In some embodiments, the thickness T1 of the electrical connector 100 when connected is 18 mm to 19 mm.

In some embodiments, the thickness T1 of the electrical connector 100 when connected is 19 mm to 25 mm. In some embodiments, the thickness T1 of the electrical connector 100 when connected is 19 mm to 24 mm. In some embodiments, the thickness T1 of the electrical connector 100 when connected is 19 mm to 23 mm. In some embodiments, the thickness T1 of the electrical connector 100 when connected is 19 mm to 22 mm. In some embodiments, the thickness T1 of the electrical connector 100 when connected is 19 mm to 21 mm. In some embodiments, the thickness T1 of the electrical connector 100 when connected is 19 mm to 20 mm.

In some embodiments, the thickness T1 of the electrical connector 100 when connected is 20 mm to 25 mm. In some embodiments, the thickness T1 of the electrical connector 100 when connected is 20 mm to 24 mm. In some embodiments, the thickness T1 of the electrical connector 100 when connected is 20 mm to 23 mm. In some embodiments, the thickness T1 of the electrical connector 100 when connected is 20 mm to 21 mm. In some embodiments, the thickness T1 of the electrical connector 100 when connected is 20 mm to 21 mm.

In some embodiments, the thickness T1 of the electrical connector 100 when connected is 21 mm to 25 mm. In some embodiments, the thickness T1 of the electrical connector 100 when connected is 21 mm to 24 mm. In some embodiments, the thickness T1 of the electrical connector 100 when connected is 21 mm to 23 mm. In some embodiments, the thickness T1 of the electrical connector 100 when connected is 21 mm to 22 mm.

In some embodiments, the thickness T1 of the electrical connector 100 when connected is 22 mm to 25 mm. In some embodiments, the thickness T1 of the electrical connector 100 when connected is 22 mm to 24 mm. In some embodiments, the thickness T1 of the electrical connector 100 when connected is 22 mm to 23 mm.

In some embodiments, the thickness T1 of the electrical connector 100 when connected is 23 mm to 25 mm. In some embodiments, the thickness T1 of the electrical connector 100 when connected is 23 mm to 24 mm. In some embodiments, the thickness T1 of the electrical connector 100 when connected is 24 mm to 25 mm.

In some embodiments, a thickness T2 of the first receptacle 102 and a thickness T3 of the second receptacle 104 is 1.5 mm. In some embodiments, the thickness T2 and the thickness T3 can be different.

In some embodiments, the thickness T2 is 1 mm to 3 mm. In some embodiments, the thickness T2 is 1 mm to 2.5 mm. In some embodiments, the thickness T2 is 1 mm to 2 mm. In some embodiments, the thickness T2 is 1 mm to 1.5 mm. In some embodiments, the thickness T2 is 1.5 mm to 3 mm. In some embodiments, the thickness T2 is 2 to 3 mm. In some embodiments, the thickness T2 is 2.5 to 3 mm.

In some embodiments, the thickness T3 is 1 mm to 3 mm. In some embodiments, the thickness T3 is 1 mm to 2.5 mm. In some embodiments, the thickness T3 is 1 mm to 2 mm. In some embodiments, the thickness T3 is 1 mm to 1.5 mm. In some embodiments, the thickness T3 is 1.5 mm to 3 mm. In some embodiments, the thickness T3 is 2 to 3 mm. In some embodiments, the thickness T3 is 2.5 to 3 mm.

In some embodiments, a thickness T4 of the conductor 114 is 1 mm. In some embodiments, the thickness T4 is 0.5 mm to 1.5 mm. In some embodiments, the thickness T4 is 0.5 mm to 1 mm. In some embodiments, the thickness T4 is 1 to 1.5 mm.

In some embodiments, a thickness T5 of the conductor 120 is the same as the thickness T4 of the conductor 114. In some embodiments, the thickness T5 of the conductor 120 is different than the thickness T4.

In some embodiments, the thickness T5 of the conductor 114 is 1 mm. In some embodiments, the thickness T5 is 0.5 mm to 1.5 mm. In some embodiments, the thickness T5 is 0.5 mm to 1 mm. In some embodiments, the thickness T5 is 1 to 1.5 mm.

In some embodiments, a distance D1 between the conductor 114 and the conductor 120 is 3 mm. In some embodiments, the distance D1 can correspond to a dimension of the openings 110 or the protrusions 112. In some embodiments, the distance D1 is 2 mm to 4 mm. In some embodiments, the distance D1 is 2 mm to 3.5 mm. In some embodiments, the distance D1 is 2 mm to 3 mm. In some embodiments, the distance D1 is 2 mm to 2.5 mm. In some embodiments, the distance D1 is 2.5 mm to 4 mm. In some embodiments, the distance D1 is 3 mm to 4 mm. In some embodiments, the distance D1 is 3.5 mm to 4 mm.

Figure 6:
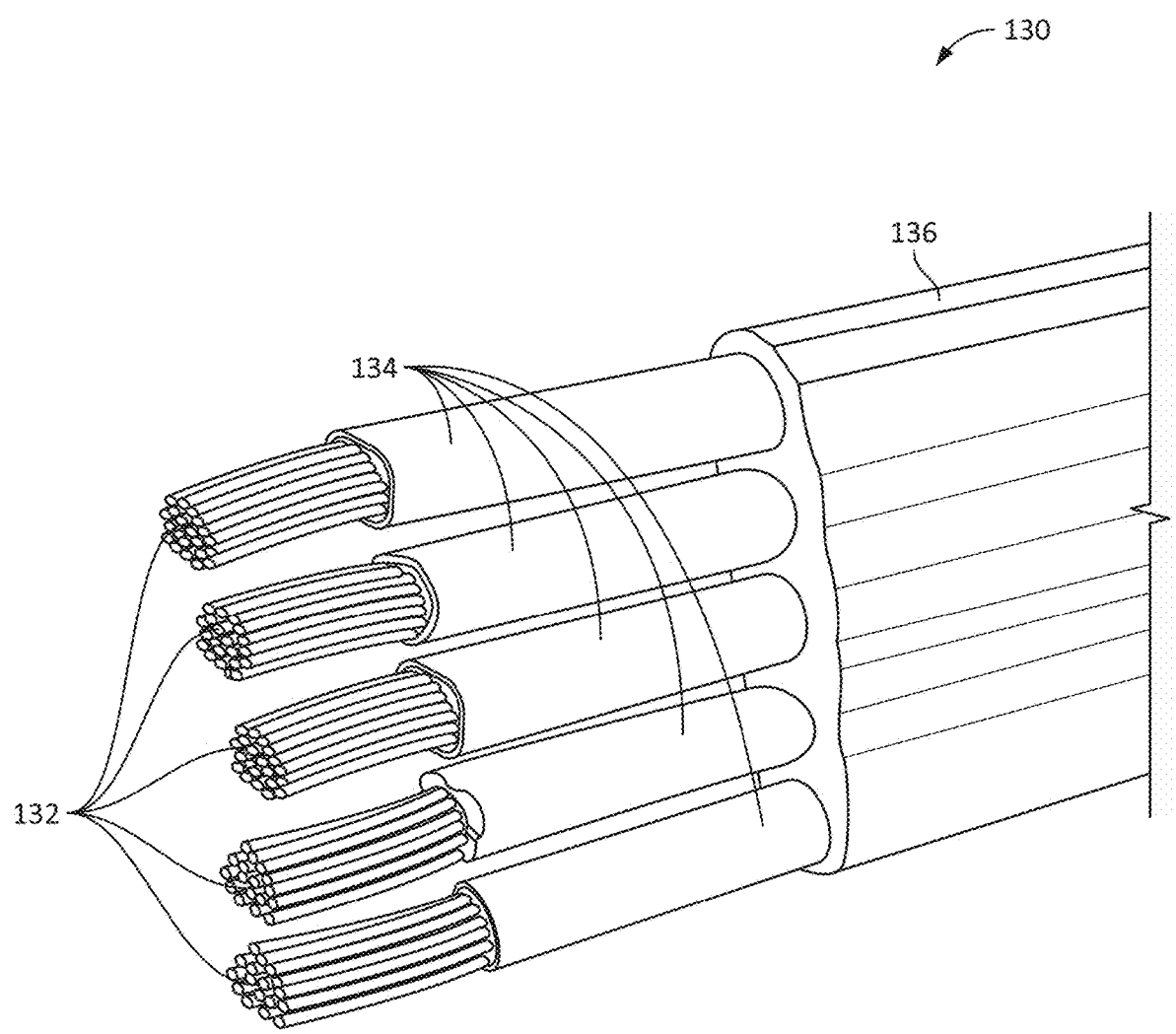
FIG. 6 shows a perspective view of a cable, according to some embodiments.

FIG. 6 shows a perspective view of a cable 130, according to some embodiments. The cable 130 can be connected to the first receptacle 102, the second receptacle 104, or the first receptacle 102 and the second receptacle 104. In some embodiments, the cable 130 includes at least one conductor 132. In some embodiments, the at least one conductor 132 includes a plurality of conductors 132. In some embodiments, the plurality of conductors 132 can be arranged linearly adjacent to each other. In some embodiments, the at least one conductor 132 can include at least one wire. In some embodiments, the at least one wire can include a conductive material (e.g., copper, copper-covered steel, high strength copper alloys, aluminum, suitable combinations thereof, or the like) surrounded by a non-conductive material 134 or coating. In some embodiments, the at least one conductor 132 can be overmolded with a non-conductive material 136. In some embodiments, the at least one conductor 132 can include a plurality of conductors 132 linearly arranged. In such embodiments, the non-conductive material 136 can maintain the plurality of conductors 132 in a linear arrangement. A number of the at least one conductor 132 can be selected based on a current capacity needed for the cable 130. In some embodiments, the at least one wire can have a gauge of 10-gauge to 18-gauge. In some embodiments, a number of the at least one wire is based on the wire gauge. Smaller wire diameters (higher gauge) can result in more wires to meet the current carrying capacity.

In some embodiments, a thickness T6 of the cable 130 is 1 mm to 25 mm. In some embodiments, the thickness T6 of the cable 130 is 3 mm to 6 mm. In some embodiments, the thickness T6 of the cable 130 is 3 mm to 5.5 mm. In some embodiments, the thickness T6 of the cable 130 is 3 mm to 5 mm. In some embodiments, the thickness T6 of the cable 130 is 3 mm to 4.5 mm. In some embodiments, the thickness T6 of the cable 130 is 3 mm to 4 mm. In some embodiments, the thickness T6 of the cable 130 is 3 mm to 3.5 mm.

In some embodiments, the thickness T6 of the cable 130 is 3.5 mm to 6 mm. In some embodiments, the thickness T6 of the cable 130 is 4 mm to 6 mm. In some embodiments, the thickness T6 of the cable 130 is 4.5 mm to 6 mm. In some embodiments, the thickness T6 of the cable 130 is 5 mm to 6 mm. In some embodiments, the thickness T6 of the cable 130 is 5.5 mm to 6 mm.

Figure 7:
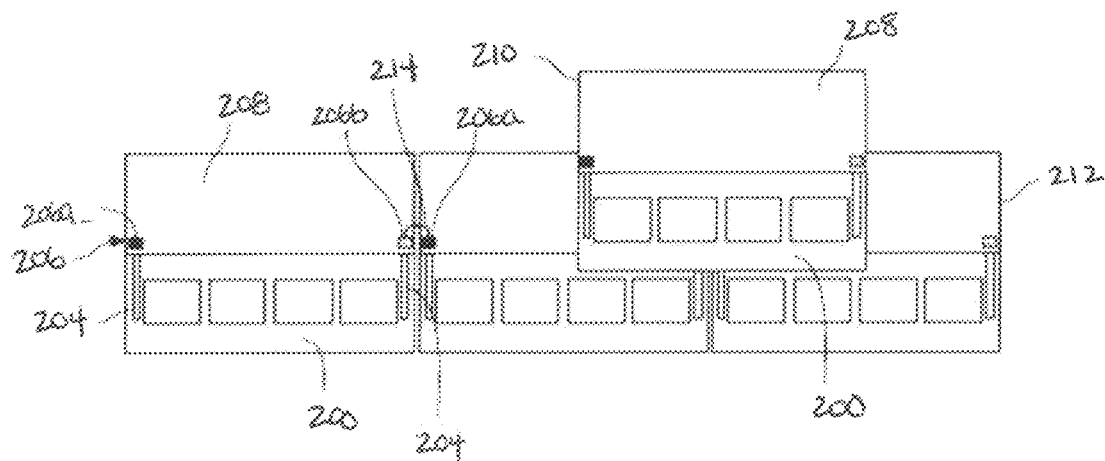
FIG. 7 shows a top plan view of a system of photovoltaic modules with electrical connectors, according to some embodiments.
Figure 8:
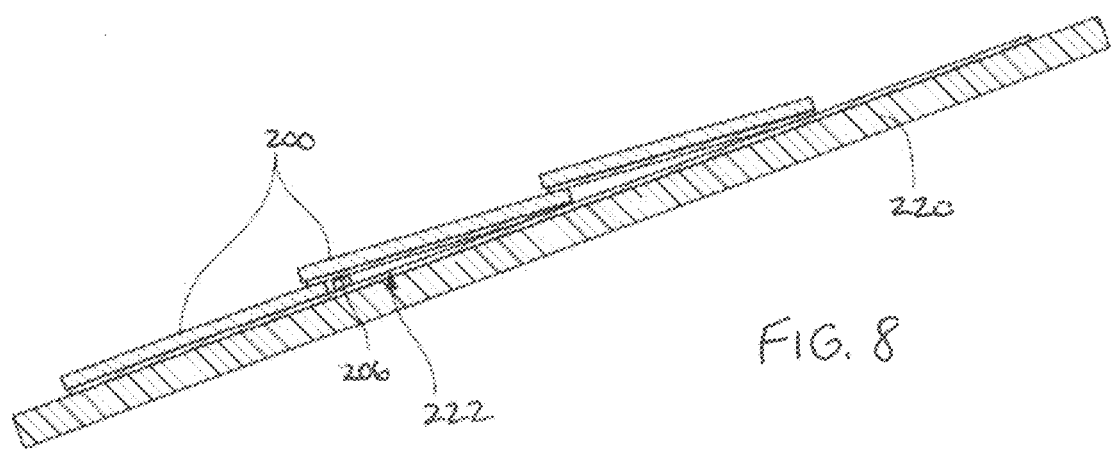
FIG. 8 shows a side cross-sectional view of a system of photovoltaic modules with electrical connectors, according to some embodiments.

FIGS. 7-8 are a top plan view and side cross-sectional view, respectively, of a system of photovoltaic modules 200 with electrical connectors, according to some embodiments. The photovoltaic modules 200 includes at least one solar cell 202 having electrical bussing 204 and at least one electrical connector 206 electrically connected to the electrical bussing 204. In an embodiment, the at least one electrical connector 206 is positioned on a head lap 208 of the photovoltaic modules 200. In an embodiment, the at least one electrical connector 206 includes a first electrical connector 206a and a second electrical connector 206b. In an embodiment, the first electrical connector 206a is positioned proximate to an end 210 and the second electrical connector 206b is positioned proximate to an end 212. In an embodiment, the first electrical connector 206a of one of the plurality of photovoltaic modules 200 is connected to the second electrical connector 206b of another of the plurality of photovoltaic modules 200. In an embodiment, the first electrical connector 206a is a male connector and the second electrical connector 206b is a female connector. In an embodiment, the first and second electrical connectors 206a, 206b are connected to one another by an electrical wire 214. In an embodiment, the first and second electrical connectors 206a, 206b are removably connected to one another. In an embodiment, when the photovoltaic modules 200 are installed to the roof deck 220, each of the electrical connectors 206 is positioned within a corresponding space 222 formed between one of the photovoltaic modules 200 and another overlapping one of the photovoltaic modules 200.

Figure 9:
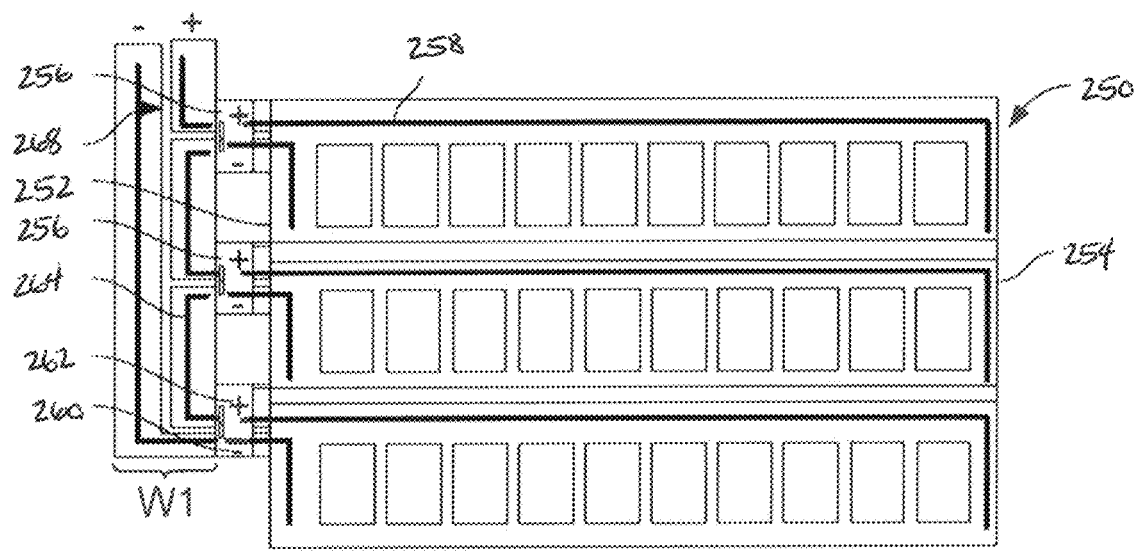
FIG. 9 shows a system having a plurality of photovoltaic modules, according to some embodiments.
Figure 10:
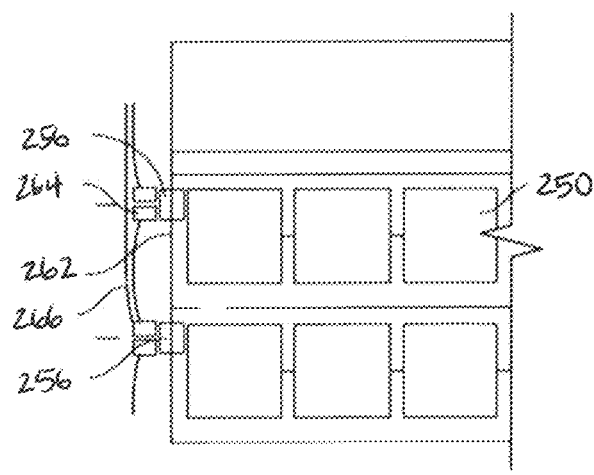
FIG. 10 shows a system having a plurality of photovoltaic modules, according to some embodiments.
Figure 11:
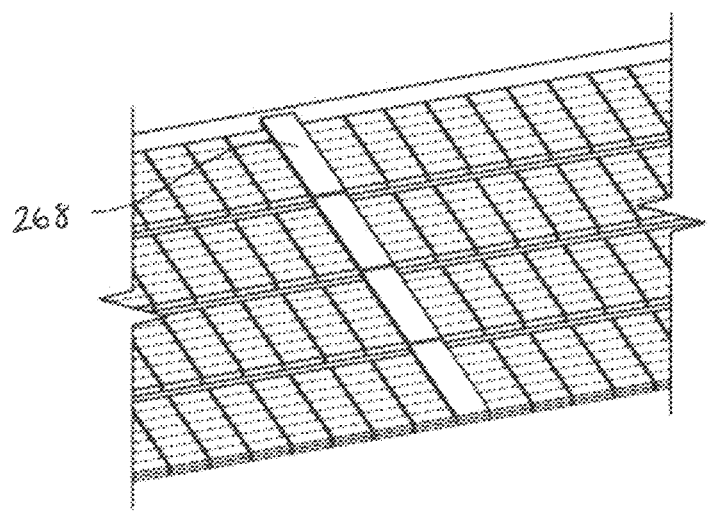
FIG. 11 shows a system having a plurality of photovoltaic modules, according to some embodiments.

FIGS. 9-11 show a system having a plurality of photovoltaic modules 250, each of which includes a first end 252 and a second end 254 opposite the first end 252. In an embodiment, each of the photovoltaic modules 250 includes an electrical connector 256. In an embodiment, the electrical connector 256 is connected to electrical bussing 258 of the photovoltaic module 250. In an embodiment, the electrical connector 256 is connected to the electrical bussing 258 at the first end 252. In another embodiment, the electrical connector 256 is connected to electrical bussing 258 of the photovoltaic module 250 at the second end 254. In an embodiment, the electrical connector 256 includes a first port 260 and a second port 262. In an embodiment, the first port 260 is a negative port and the second port 262 is a positive port. In another embodiment, the first port 260 is a positive port and the second port 262 is a negative port. In an embodiment, the second port 262 of one of the photovoltaic modules 250 is electrically connected to the first port 260 of an adjacent one of another of the photovoltaic modules 250. In another embodiment, the second port 262 of one of the photovoltaic modules 250 is electrically connected to the first port 260 of an adjacent one of another of the photovoltaic modules 250 by electrical bussing 264 (FIG. 9). In an embodiment, the second port 262 of one of the photovoltaic modules 250 is electrically connected to the first port 260 of an adjacent one of another of the photovoltaic modules 250 by an electrical wire 266 (FIG. 10).

Referring to FIG. 11, in an embodiment, the electrical connector 256 is located within a wire channel 268. In an embodiment, the wire channel 268 is located proximate to the first end 252 of the photovoltaic module 250. In another embodiment, the wire channel 268 is located proximate to the second end 254 of the photovoltaic module 250. In an embodiment, the wire channel 268 includes a width W1 of 1 inch to 5 inches. In an embodiment, the wire channel 268 includes a width W1 of 1 inch to 4 inches. In an embodiment, the wire channel 268 includes a width W1 of 1 inch to 3 inches. In an embodiment, the wire channel 268 includes a width W1 of 1 inch to 2 inches. In an embodiment, the wire channel 268 includes a width W1 of 2 inches to 5 inches. In an embodiment, the wire channel 268 includes a width W1 of 2 inches to 4 inches. In an embodiment, the wire channel 268 includes a width W1 of 2 inches to 3 inches. In an embodiment, the wire channel 268 includes a width W1 of 3 inches to 5 inches. In an embodiment, the wire channel 268 includes a width W1 of 3 inches to 4 inches. In an embodiment, the wire channel 268 includes a width W1 of 4 inches to 5 inches.

In an embodiment, the wire channel 268 includes a width W1 of 1 inch. In an embodiment, the wire channel 268 includes a width W1 of 2 inches. In an embodiment, the wire channel 268 includes a width W1 of 3 inches. In an embodiment, the wire channel 268 includes a width W1 of 4 inches. In an embodiment, the wire channel 268 includes a width W1 of 5 inches.

In an embodiment, the wire channel 268 includes a height of 5 mm to 15 mm. In an embodiment, the wire channel 268 includes a height of 5 mm to 10 mm. In an embodiment, the wire channel 268 includes a height of 10 mm to 15 mm. In an embodiment, the wire channel 268 includes a height of 5 mm. In an embodiment, the wire channel 268 includes a height of 10 mm. In an embodiment, the wire channel 268 includes a height of 15 mm.

Figure 12:
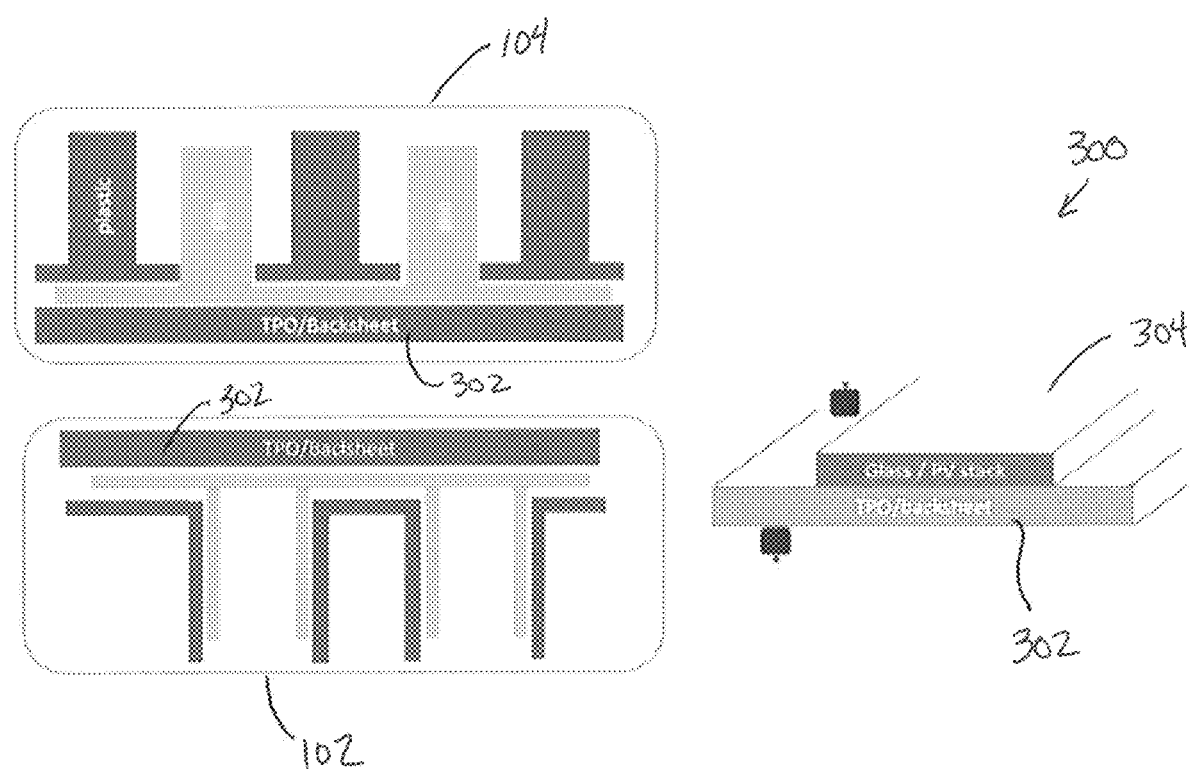
FIG. 12 shows a photovoltaic module, according to some embodiments. of second non-conductive openings.

FIG. 12 shows a photovoltaic module 300, according to some embodiments. The photovoltaic module 300 includes the first receptacle 102 and the second receptacle 104 integrated into a backsheet 302 of the photovoltaic module 300. In some embodiments, integrating the first receptacle 102 and the second receptacle 104 into the photovoltaic module 300 can additionally reduce a protruding height of the first receptacle 102 and the second receptacle 104 instead of being disposed on a surface of the photovoltaic module 300. The photovoltaic module 300 also includes a solar cell 304.

Figure 13:
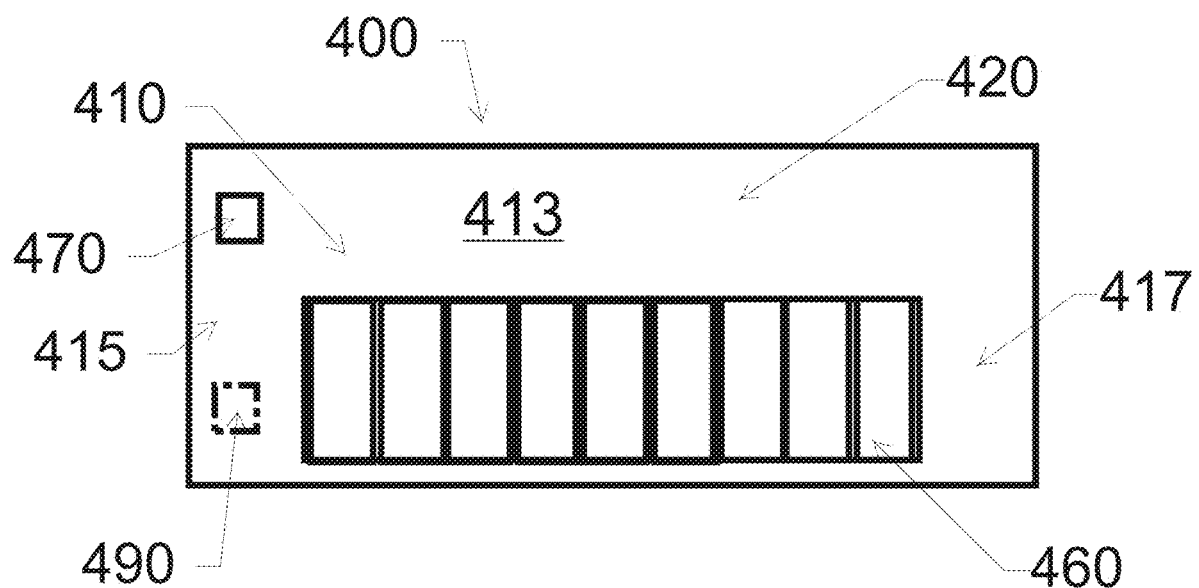
FIG. 13 shows a top view of a photovoltaic module, according to some embodiments.
Figure 14:
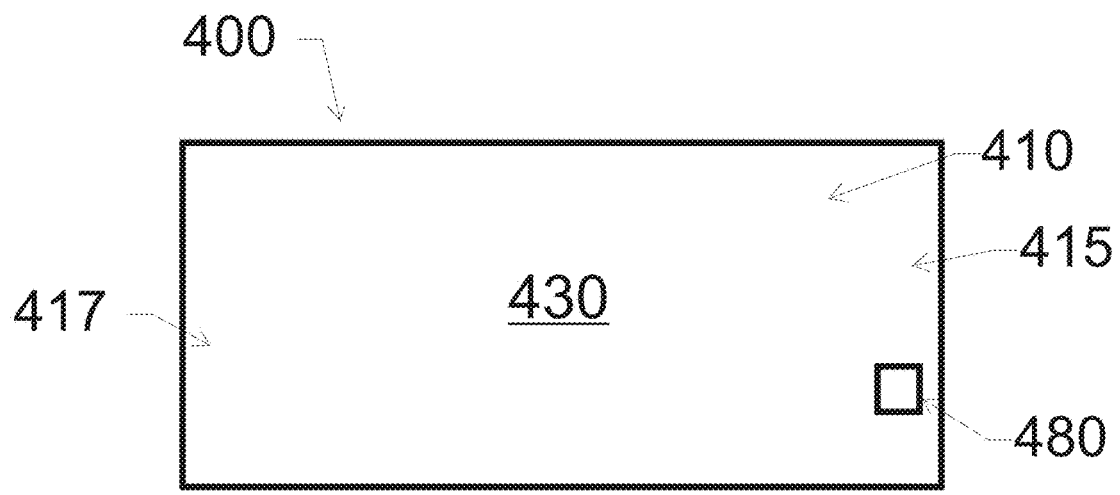
FIG. 14 shows a bottom view of the photovoltaic module of FIG. 13, according to some embodiments.
Figure 15:
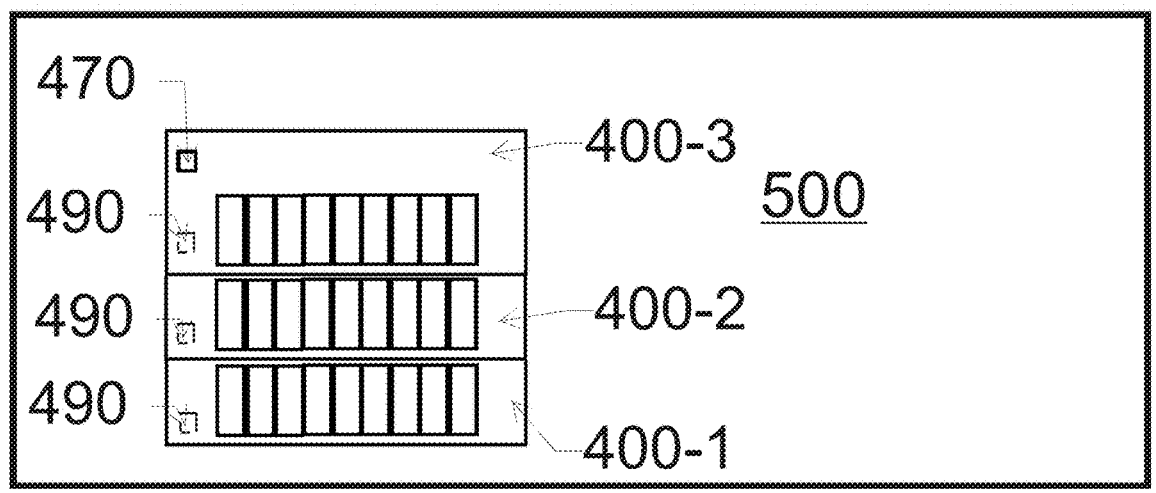
FIG. 15 shows a system including a plurality of photovoltaic modules of FIGS. 13 and 14, according to some embodiments.

FIGS. 13-15 show a photovoltaic module 400, as well as a system including a plurality of photovoltaic modules 400 installed above a roof deck 500, in accordance with some embodiments. As shown in the figures, the plurality of photovoltaic modules 400 may comprise at least a first photovoltaic module 400-1, a second photovoltaic module 400-2, and a third photovoltaic module 400-3. In some embodiments, the system may include more than three photovoltaic modules 400. In some embodiments, the system may include less than three photovoltaic modules 400. In accordance with some embodiments, within the system, the photovoltaic modules 400 may be in a single column. In with some embodiments, within the system, the photovoltaic modules 400 may be in more than one column. In some embodiments, within the system, the photovoltaic modules 400 may be in two, three, four, or more than four columns. In some embodiments, the column or each of the columns of photovoltaic modules 400 may include two, three, four, five, six, seven, eight, nine, ten, or more than ten photovoltaic modules 400. In some embodiments, non-photovoltaic roofing shingles may be installed above the roof deck, proximate sides of the photovoltaic modules 400.

In some embodiments, the photovoltaic module 400 may comprise a layer 410. In some embodiments, the layer 410 may comprise more than one layer (for example, two, three, four, five, or more than five layers). The layer 410 may comprise a top surface 420, and a bottom surface 430 that is opposite the top surface 420. In some embodiments, the top surface 420 of the photovoltaic module 400 may be an uppermost surface of the photovoltaic module 400 when the photovoltaic module 400 is installed above the roof deck 500, such that the top surface 420 is a surface of the photovoltaic module 400 which is farthest from the roof deck 500. In some embodiments, the bottom surface 430 may be a lowermost surface of the photovoltaic module 400 when the photovoltaic module 400 is installed above the roof deck 500, such that the bottom surface 430 is a surface of the photovoltaic module 400 which is closest to the roof deck 500. In some embodiments, the system may include an underlayment above a top surface of the roof deck 500—that is between the roof deck and the photovoltaic modules 400. Thus, in some embodiments, the bottom surface 430 may be the surface of the photovoltaic module 400 which is closest to the underlayment.

The photovoltaic module 400 may comprise a plurality of solar cells 460, in accordance with some embodiments of the invention. The solar cells 460 may be as described herein. In some embodiments, the solar cells 460 may be above the top surface 420 of the layer 410. In some embodiments, the solar cells 460 may be directly on the top surface 420 of the layer 410. In some embodiments, one or more additional layers may be between the solar cells 460 and the top surface 420 of the layer 410. In some embodiments, the solar cells 460 may be the top surface 420 of the photovoltaic module 400. In some embodiments, the solar cells 460 may be embedded within the layer 410. In some embodiments, the solar cells 460 may be below the top surface 420 of the photovoltaic module 400.

In some embodiments, in the system, at least one of the photovoltaic modules 400 may comprise a first receptacle 470 that is above the top surface 420. In some embodiments, the first receptacle 470 may be directly on the top surface 420. In some embodiments, the first receptacle 470 may be offset from (e.g., spaced apart from) the top surface 420. In some embodiments, the first receptacle 470 may be similar in structure and function and in accordance with the first receptacle 102, as described. In some embodiments, the first receptacle 470 may be similar in structure and function and in accordance with the second receptacle 104, as described. Thus, in some embodiments, the first receptacle 470 may comprise a plurality of first non-conductive openings, and a plurality of first conductive members in the plurality of first non-conductive openings. In some embodiments, the first non-conductive openings may be similar in structure and function and in accordance with the description of the non-conductive openings 110, or provided between the non-conductive protrusions 112, as described. In some embodiments, the first conductive members may be similar in structure and function and in accordance with the description of the conductive openings 116, or the members or pins 122. The first receptacle 470 may be in electrical communication with the solar cells 460 of the photovoltaic module 400, bussing of the photovoltaic module 400, and/or other electrical components of the photovoltaic module 400 and/or of the roofing system that includes the photovoltaic modules 400.

In some embodiments, in the system, at least one of the photovoltaic modules 400 may comprise a second receptacle 480 that is below the bottom surface 430. In some embodiments, in the system, the second receptacle 480 may be directly on the bottom surface 430. In some embodiments, in the system, the second receptacle 480 may be offset from (e.g., spaced apart from) the bottom surface 430. In some embodiments, the a second receptacle 480 may be similar in structure and function and in accordance with the first receptacle 102, as described. In some embodiments, the second receptacle 480 may be similar in structure and function and in accordance with the second receptacle 104, as described. Thus, in some embodiments, the second receptacle 480 may comprise a plurality of second non-conductive openings, and a plurality of second conductive members in the plurality of second non-conductive openings. In some embodiments, the second non-conductive openings may be similar in structure and function and in accordance with the description of the non-conductive openings 110, or provided between the non-conductive protrusions 112, as described. In some embodiments, the second conductive members may be similar in structure and function and in accordance with the description of the conductive openings 116, or the members or pins 122. The second receptacle 480 may be in electrical communication with the solar cells 460 of the photovoltaic module 400, bussing of the photovoltaic module 400, and/or other electrical components of the photovoltaic module 400 and/or of the roofing system that includes the photovoltaic modules 400.

In some embodiments, the photovoltaic module 400 may include a headlap portion 413, as well as a side lap portion 415 and a side lap portion 417. In some embodiments, either or both of the first receptacle 470 and/or the second receptacle 480 may be above and below, respectively, the headlap portion 413. In some embodiments, either or both of the first receptacle 470 and/or the second receptacle 480 may be above and below the side lap portion 415, respectively. In some embodiments, either or both of the first receptacle 470 and/or the second receptacle 480 may be above and below the side lap portion 417, respectively. In some embodiments, the solar cells 460 may form a reveal portion of the photovoltaic module 400.

One or more, or all, of the photovoltaic modules 400, and/or other components described herein, may be as described in U.S. Pat. No. 11,251,744, issued Feb. 15, 2022, titled "Photovoltaic Shingles and Methods of Installing Same," and/or PCT publication WO 2022051593, published Mar. 10, 2022, titled "Building Integrated Photovoltaic System," the disclosures of which are incorporated by reference herein in their entireties.

As shown in FIG. 15, at least a portion of the second photovoltaic module 400-2 overlaps at least a portion of the first photovoltaic module 400-1, and at least a portion of the third photovoltaic module 400-3 overlaps at least a portion of the second photovoltaic module 400-2. In some embodiments, a portion of the bottom surface of the second photovoltaic module 400-2 below the reveal portion overlaps the headlap portion 413 of the first photovoltaic module 400-1. When the photovoltaic modules 400 are overlapped, the first receptacle 470 of the first photovoltaic module 400-1 may be in mechanical connection with the second receptacle 480 of photovoltaic module 400-2 (that is, the housings are mechanically connected to one another), such that the first conductive members of the first receptacle 470 are in electrical communication with the second conductive members of the second receptacle 480, as described. Also as described, when the receptacles 470 and 480 are connected, an overall thickness T1 of the connected receptacles 470 and 480 may be less than 25 mm, may be less than 20 mm, may be less than 10 mm, may be less than 5 mm, or may be of a thickness as described. Similarly, in some embodiments, a portion of the bottom surface of the third photovoltaic module 400-3 below the reveal portion overlaps the headlap portion 413 of the second photovoltaic module 400-2. When the photovoltaic modules 400 are overlapped, the first receptacle 470 of second photovoltaic module 400-2 may be in mechanical connection with the second receptacle 480 of third photovoltaic module 400-3, such that the first conductive members of the first receptacle 470 are in electrical communication with the second conductive members of the second receptacle 480, as described.

In some embodiments of the invention, each of the photovoltaic modules 400 includes the first receptacle 470 and the second receptacle 480.

In accordance with some embodiments, a cable, such as cable 130, may be connected to either or both of the first receptacle 470, and/or the second receptacle 480.

In some embodiments of the invention, the top surface 420 of the photovoltaic module 400 may include alignment features 490, such as but not limited to a marking, etching, or other indication, showing a location of the second receptacle on the bottom surface 430. This alignment feature 490 may facilitate connection of the receptacles 470 and 480 when installing the photovoltaic modules 400 above the roof deck. In some embodiments, the alignment feature 490 may be on the top surface 420 on the headlap or side lap portion of the photovoltaic module 400, indicating the location of the receptacle 470 and 480 that is below the headlap or side lap portion of bottom surface 430, respectively.

Figure 16:
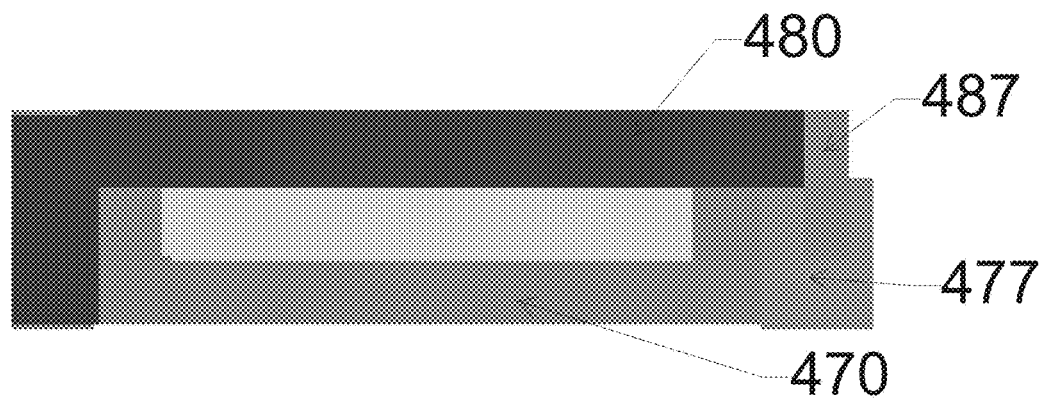
FIG. 16 shows a cross-sectional view of a first receptacle connected to a second receptacle, according to some embodiments.

As shown in FIG. 16, the first receptacle 470 and/or the second receptacle 480 may include connection features that facilitate connection of the receptacles 470 and 480 to one another, and/or that facilitates maintaining the connection between the receptacles 470 and 480, according to some embodiments. Although the figure shows specific connection features on the first receptacle 470, and specific connection features on the second receptacle 480, it is understood that the connection features illustrated on the first receptacle 470 may be instead on the second receptacle 480, and/or that the connection features illustrated on the second receptacle 480 may be instead on the first receptacle 470. As FIG. 16 illustrates, in some embodiments, the first receptacle 470 includes an opening 477 as a connection feature, and the second receptacle 480 includes a protrusion 487 as a connection feature. Thus, in some embodiments, when the first receptacle 470 is in mechanical connection with the second receptacle 480, and the first conductive members are in electrical communication with the second conductive members, the protrusion 487 may be received within the opening 477. The protrusion 487 may connect with the opening 477 to resist mechanical disconnection of the receptacles 470 and 480, and/or to resist electrical disconnection of the conductive members, in some embodiments. In some embodiments, the protrusion 487 and/or the opening 477 may be sized, shaped, oriented, and/or located to facilitate the described mechanical connection and/or electrical connection.

Figure 17:
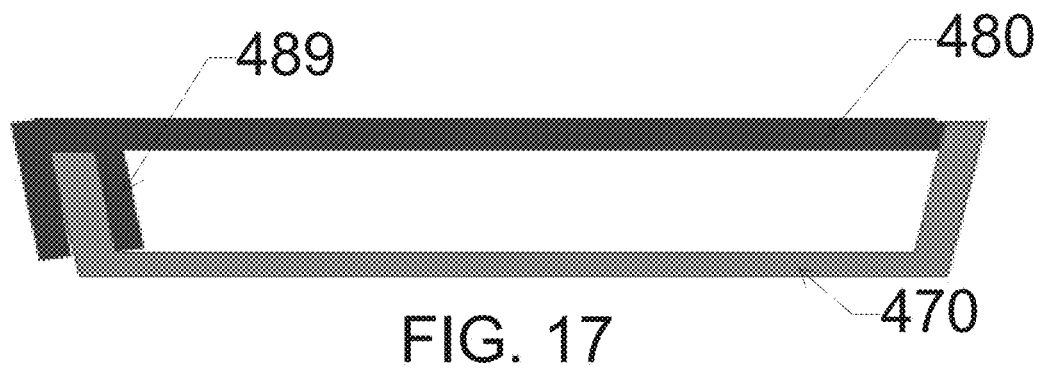
FIG. 17 shows a cross-sectional view of a first receptacle connected to a second receptacle, according to some embodiments.

FIG. 17 shows other connection features that may be included on the first receptacle 470 and second receptacle 480, according to some embodiments. As shown in the figure, the first receptacle 470 and the second receptacle 480 may have a conical shape as a connection feature, which facilitates either or both of the described mechanical connection and/or electrical connection, such as by aligning the receptacles 470 and 480 with one another, and/or maintaining the connection between the receptacles. In some embodiments, the second receptacle 480 includes a latch 489 as a connection feature. The latch 489 may achieve an interference or other fit with a portion of the first receptacle 470. As discussed, although the figure shows specific connection features on the first receptacle 470, and specific connection features on the second receptacle 480, it is understood that the connection features illustrated on the first receptacle 470 may be instead on the second receptacle 480, and/or that the connection features illustrated on the second receptacle 480 may be instead on the first receptacle 470.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

The invention claimed is:

1. A system, comprising:
a plurality of photovoltaic modules installed above a roof deck,
wherein the plurality of photovoltaic modules comprises at least a first photovoltaic module and a second photovoltaic module installed in a same column above the roof deck,
wherein each of the plurality of photovoltaic modules comprises:
a first end, a second end opposite the first end, an upper edge extending from the first end to the second end, and a lower edge opposite the upper edge and extending from the first end to the second end;
a first side lap portion at the first end and extending from the upper edge to the lower edge;
a top surface;
a bottom surface opposite the top surface;
a plurality of solar cells;
a first receptacle on the top surface of the first side lap portion,
wherein the first receptacle is composed of a first non-conductive material,
wherein the first non-conductive material has a plurality of first openings formed therein,
wherein the first receptacle comprises:
a plurality of first conductive members, each of which is located in a corresponding one of the plurality of first openings; and
a second receptacle on the bottom surface of the first side lap portion,
wherein the second receptacle is composed of a second non-conductive material,
wherein the second non-conductive material has a plurality of second openings formed therein,
wherein the second receptacle comprises:
a plurality of second conductive members, each of which is located in a corresponding one of the plurality of second openings,
wherein at least a portion of the first side lap portion of the second photovoltaic module overlaps at least a portion of the first side lap portion of the first photovoltaic module, and
wherein the first receptacle of the first photovoltaic module is in mechanical connection and electrical communication with the second receptacle of the second photovoltaic module.

2. The system of claim 1, wherein a thickness of a connection of the first receptacle and the second receptacle is 1 mm to 20 mm.

3. The system of claim 1, further comprising: a cable comprising a plurality of wires connected to one of the first receptacle or the second receptacle.

4. The system of claim 3, wherein the wires of the plurality of wires of the cable are arranged linearly adjacent to each other.

5. The system of claim 4, wherein the cable has a thickness of 1 mm to 10 mm.

6. The system of claim 1, wherein each of the first conductive members of the plurality of first conductive members comprises a conductive pin.

7. The system of claim 1, wherein each of the second conductive members of the plurality of second conductive members comprises a conductive pin.

8. The system of claim 1, wherein each of the first receptacle and the second receptacle is configured to prevent access to the plurality of first conductive members and the plurality of second conductive members in accordance with UL 6703.

9. The system of claim 1, wherein the first receptacle comprises a first housing, wherein the second receptacle comprises a second housing, and wherein at least a portion of the first housing on the first photovoltaic module surrounds at least a portion of the second housing on the second photovoltaic module.

10. The system of claim 1, wherein the first receptacle comprises a first housing, wherein the second receptacle comprises a second housing, and wherein at least a portion of the second housing on the second photovoltaic module surrounds at least a portion of the first housing on the first photovoltaic module.

11. The system of claim 1, wherein the first conductive members of the first photovoltaic module surround the second conductive members of the second photovoltaic module.

12. The system of claim 1, wherein the second conductive members of the second photovoltaic module surround the first conductive members of the first photovoltaic module.

13. The system of claim 1, wherein at least one of the first receptacle and the second receptacle includes a connector configured to facilitate mechanical connection with the other one of the first receptacle and the second receptacle.

14. The system of claim 1, wherein the first receptacle is adjacent a top edge of the first photovoltaic module, and wherein the second receptacle is adjacent a bottom edge of the second photovoltaic module.

15. The system of claim 1, wherein each of the plurality of photovoltaic modules further comprises: a second side lap portion opposite the first side lap portion.

* * * * *